United States Patent [19]

Gavrila

[11] Patent Number: 4,957,136

[45] Date of Patent: * Sep. 18, 1990

[54] NON-FLOWING MODULATING PILOT OPERATED RELIEF VALVE

[75] Inventor: Gelu N. Gavrila, Parsipanny, N.J.

[73] Assignee: Teledyne Industries, Inc., Los Angeles, Calif.

[*] Notice: The portion of the term of this patent subsequent to May 6, 2006 has been disclaimed.

[21] Appl. No.: 336,433

[22] Filed: Apr. 11, 1989

Related U.S. Application Data

[63] Continuation-in-part of Ser. No. 292,558, Dec. 30, 1988, Pat. No. 4,905,727.

[51] Int. Cl.$^5$ ............................................. G05D 16/00
[52] U.S. Cl. ..................................... 137/488; 137/102
[58] Field of Search ......................... 137/488, 499, 102

[56] References Cited

U.S. PATENT DOCUMENTS

| | | |
|---|---|---|
| 2,714,895 | 8/1955 | Rockwell . |
| 3,221,765 | 12/1965 | Farris . |
| 3,977,423 | 8/1976 | Clayton ........................... 137/488 X |
| 4,040,445 | 8/1977 | McCormick . |
| 4,129,141 | 12/1978 | Vogeli ............................. 137/488 X |
| 4,172,466 | 10/1979 | Pattarini et al. . |
| 4,200,116 | 4/1980 | Gemignani . |
| 4,458,716 | 7/1984 | Danre . |
| 4,519,416 | 5/1985 | Chaouloff et al. . |
| 4,615,356 | 10/1986 | Reip .................................... 137/488 |
| 4,648,553 | 3/1987 | Muller . |

Primary Examiner—Alan Cohan
Attorney, Agent, or Firm—Beveridge, DeGrandi & Weilacher

[57] ABSTRACT

A pilot operated relief valve which includes a non-flowing modulated pilot valve and a main valve. The pilot utilizes a torsion device in connection with transducers and valves. The transducers relate variations in pressure within the valve system to the torsion device. The torsion device, in turn, acts to open and close various ports of the pilot valve so as to achieve modulated relief of overpressurized fluid from a pressure system. In addition, the torsion device can be manipulated to provide for easily achieved and accurate set pressure positions.

89 Claims, 18 Drawing Sheets

NON-FLOWING MODULATING PILOT OPERATED RELIEF VALVE

This application is a continuation-in-part of U.S. Ser. No. 07/292,558 filed Dec. 30, 1988, now U.S. Pat. No. 4,905,727 issued Mar. 6, 1990 which is incorporated herein by reference.

FIELD OF THE INVENTION

This invention relates to a relief system for relieving excess pressure from fluid pressurized systems. More particularly, the invention features an improved pilot operating relief valve having a non-flowing modulating pilot and a main valve.

BACKGROUND OF THE INVENTION

A conventional pressure relief valve in its simplest form typically includes a valve seated by an adjustable compression spring against the force of the fluid pressure of the system it protects. More sophisticated designs include internal mechanisms which require adjustment when the system fluid is changed. However, when adjusted for one fluid, such valves tend to become unstable when called on to handle another. In addition, repeat accuracy of the set or blow-off point is difficult to achieve in large spring-loaded valves because of non-uniform heating of the large, set-pressure adjustment spring. To confront many of the problems associated with self-activated spring loaded pressure relief valves, various pressure operated relief valves were developed. Pressure operated relief valves include a pilot valve acting in association with a main valve. Generally, pilot operated relief valves allow for superior quality in control parameters such as leak tightness, flow characteristics and stability.

Snap acting (popping) flowing spring-loaded valves were some of the first pilots used in conjunction with main valves. These pilots were generally utilized with main valves having a linear piston within a cylinder. Thereafter, the concept of providing modulation or proportional behavior in the pilot to prevent excessive amounts of product discharge captivated the field of research and design. It was apparent, however, that these latter concept presented-insurmountable exploitation problems due to flow through the pilot during main valve discharge and the resultant failure of the pilot caused by contact with the industrial fluids and associated impurities. In light of these failures in the pilots, it became apparent that non-flowing pilots were needed to avoid contamination by industrial fluids flowing through the pilots.

Various pilot operated relief valves using non-flowing pilots have been developed which utilize diaphragms as sensors, an axial displacement design, soft seated pilot valves and often external tubing to interconnect the pilot to the main valve. Such devices, although avoiding many of the problems associated with pressure operated relief valves which allowed for fluid flow in the pilot, present problems in areas such as stability, adaptability to new and old systems, field service, long and short term reliability, efficiency, ease in adjustment, etc. These problems can be said to be due, to some extent, to the relatively complicated designs associated with these pilot operated relief valves.

SUMMARY OF THE INVENTION

The present invention provides a design which confronts the problems associated with the prior art pilot operated relief valves and, in so doing, presents a pressure relief system which, among other, is stable, easily adapted to both new and old systems, easy to service in the field, reliable, efficient, durable, relatively inexpensive, and easy to adjust for different set pressures. These advantages are due, in part, to the relatively simplistic approach made available by thorough research into the interrelated characteristics of static and dynamic fluid flow, pressure, and temperature within a system relying on a pilot operated relief valve.

In the first embodiment of the invention, a pilot operated relief valve comprises a four-stage non-flow pilot valve and a main valve which, together, act to prevent damage to a vessel due to excessive pressure. The four-stage pilot valve has a vertical torsion bar which is integrally connected to a vertical cylindrical support. The torsion bar provides a set pressure adjusting device which can be easily adjusted to meet pressure requirements of the pressure vessel. Extending horizontally off the cylindrical support is both a lever and a follower bar. Each end of the lever is connected to a respective pressure sensor (e.g., bellows) which act as transducers to transform pressure variations into a linear displacement of the lever. The follower bar is adapted to pivot about a vertical axis and either open or close an inlet valve and an adjacent vent valve. The transducers are positioned on opposite sides of the lever and arranged such that rotation of the cylindrical support and attached torsion bar results in an equal angular displacement of each pressure sensor.

The follower bar and lever lie in separate chambers sealed off from one another by an O-ring positioned between the cylindrical support and a bearing surface forming part of the pilot valve housing. The two chambers remain sealed from one another, except in emergency situations whereupon a preventive disc ruptures when a certain pressure is exceeded and fluid pressure is relieved to the atmosphere through a hole in one of the chambers.

In operation, the torsion bar is set at an initial torque value which places the lever and follower bar in the "set" position designated A. In position A, the piston of the main valve is biased to its closed position by a spring. In addition, the lever is an abutment with a torsion stop and the follower bar is positioned such that the vent valve is firmly shut while the inlet valve is open.

A common pressure communication line exists between the pressure vessel, inlet valve and one of the two pressure transducers. Moreover, a pressure communication line extends between the valve chamber in which the follower bar rotates and the other of the two pressure transducers. The pilot valve chamber is in communication with the main valve cylinder containing the piston which covers the nozzle extending from an opening in the pressure vessel being protected.

Hence, as the pressure in the vessel begins to rise, the pressure sensors will transduce the rise into movement of both the lever and the follower bar in a direction against the initial torque rotation. At some point, rotation of the lever and follower bar reach a neutral position. In the neutral position, both the vent valve and the inlet valve are closed and the main piston retains a sealing relationship with the main valve nozzle. The inclusion of a sealing ring on the nozzle is also contemplated to further enhance the seal between the piston and nozzle.

A further increase in vessel pressure causes the lever and follower bar to rotate even further away from the original pre-torque position. This movement opens the vent valve and firmly closes the inlet valve which results in the relief of pressure in both the pilot valve chamber and interconnected main valve cylinder. A relief of pressure in the main valve cylinder (i.e., dome pressure) enables the pressure in the vessel to raise the main piston such that pressure in the vessel escapes out an exhaust conduit. In the initial stages of pressure increase within the vessel, the invention provides for a modulating operation mode wherein the opening of the main valve is proportional to the amount of overpressure. The modulating operation mode ceases when the forces acting to raise the main valve piston completely overcome the opposing forces created by the dome pressure and a biasing spring. Relief of the pressure in the vessel eventually allows for the dome pressure and spring actuated main valve piston to move back into vessel sealing position and the follower bar and lever to move into the set position.

In a second embodiment of the invention, rather than a rigid follower bar with elastic pilot valve covers, an elastic blade having each of its ends connected to the pilot housing is utilized.

In a third embodiment of the invention, the torsion bar of the first embodiment is replaced with a elastic non-symmetric follower having blades with different modules of elasticity. This version also has means for changing the length and the boundary conditions of the elastic blades to permit torque adjustments.

The fourth embodiment of the invention is a compressed version of the first embodiment. In this embodiment, the torsion bar of the first embodiment is replaced with non-symmetrical elastic blades which are like those of the third embodiment. The elastic blades are attached to a central cylinder and the central cylinder has a disc or reversed cup attached to its upper end. Attached to the disc or cup are a pair of diametrically opposed transducers.

In a fifth embodiment of the invention, rather than having the inlet/outlet valve biasing mechanism within the controlled pressure chamber, the biasing mechanism is external of the controlled pressure chamber. A second feedback loop, transmitting a main valve discharged massflow rate dependent pressure signal to the pilot's second pressure chamber, improves low pressure and proportionality performances.

Other features and advantages of the invention will become apparent upon reference to the following description of the preferred embodiments of the drawings.

BRIEF DESCRIPTION OF THE DRAWINGS

FIG. 3 illustrates in plan the embodiment of

DESCRIPTION OF THE PREFERRED EMBODIMENTS

Figure 1:
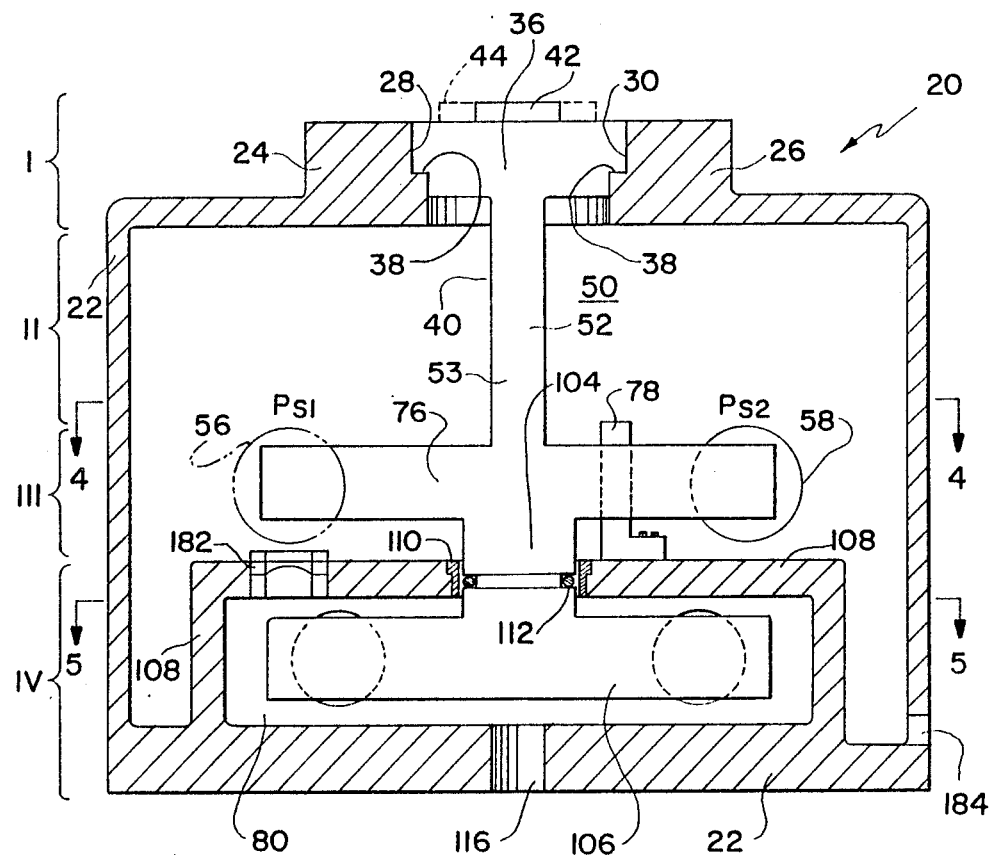
FIG. 1 illustrates in vertical cross-section a first embodiment of a non-flowing modulating pilot of the present invention.
Figure 3:
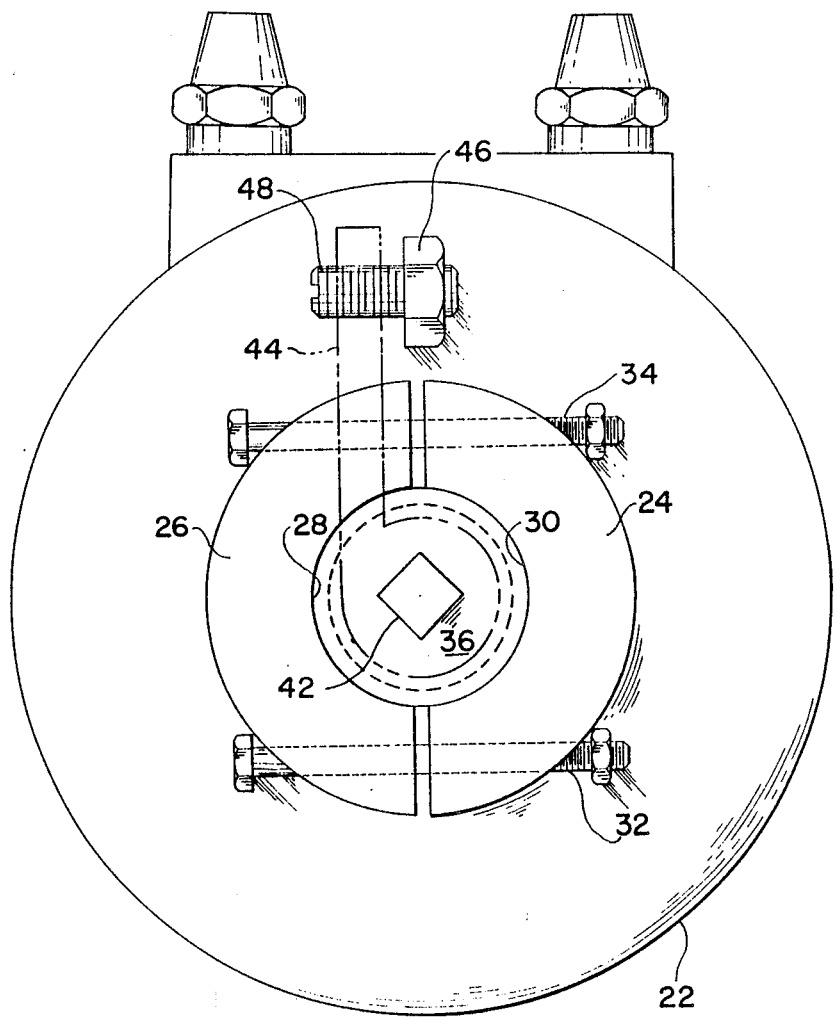

FIG. 1 shows in vertical cross-section a first embodiment of non-flowing modulating pilot 20 which is illustrated as having four stages (I to IV). First stage I, as best illustrated in FIG. 1 and FIG. 3, includes an upper region of pilot housing 22 having two clamping halves 24, 26. As illustrated in FIG. 3, clamping halves 24, 26 each include interior clamping surfaces 28, 30 which can be brought closer together by adjustment means such as a pair of threaded bolts (32, 34).

Interior surfaces 28, 30 are preferably concave in shape although other configurations are possible. A torsion bar retainer 36 is positioned between the adjustable clamping halves 24, 26 in either a rigidly fixed state or an adjustable state depending upon the position of adjustment means 32, 34. Retainer 36 is supported on shoulders 38 which form part of interior surfaces 28, 30. Shoulders 38 thus provide support for the entire torsion device 40.

Affixed to the upper end of torsion bar 36 retainer is attachment means 42 having a shape suitable for attachment with attachment device 44 shown in dashed lines in FIGS. 1 and 3. Extending off of the upper region of housing 22 is ear 46 (FIG. 3) with a threaded hole for receiving threaded rod 48. A threaded hole is also formed at the end of attachment device 44. When clamping halves 24, 26 are not in a compressive state about torsion bar retainer 36, attachment device 44 can be adjusted by rotation of threaded rod 48 to various positions which, as will be explained more fully hereafter, allows one to easily establish a set pressure for the system being regulated by pilot 20. Once the torsion retainer 36 is in a desired position clamping halves 24, 26 are brought closer together by adjustment means 32, 34 and torsion retainer 36 is locked into position by friction. Upon locking torsion retainer 36 in position attachment device 44 and rod 48 can be detached until further use is desired.

The second stage of pilot 20 includes the upper region of chamber 50 and torsion bar 52 which extends off of retainer 36. Torsion bar 52 is dimensioned in accordance with the various requirements which will be expected of pilot 20. In a preferred embodiment torsion bar 52 includes an upper region 53 which is circular in cross-section and a diameter of about 0.06 to 2.4 inches.

Figure 7:
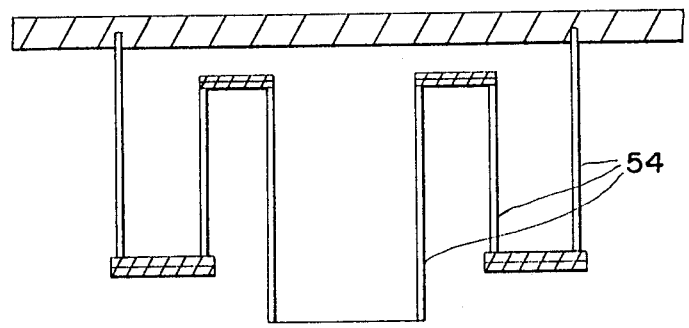
FIG. 7 illustrates in cut-away a variant of the torsion bar in the embodiment of FIG. 1.

In FIG. 7 there is shown a compacted variant of torsion device 40 that includes a plurality of torsion rods 54 each interconnected and positioned to on side of the other. In addition to being interconnected to each other, each torsion rod is secured at one end to a rigid top container. Preferably chamber 50, within which torsion device 40 extends, is maintained at atmospheric pressure.

Figure 4:
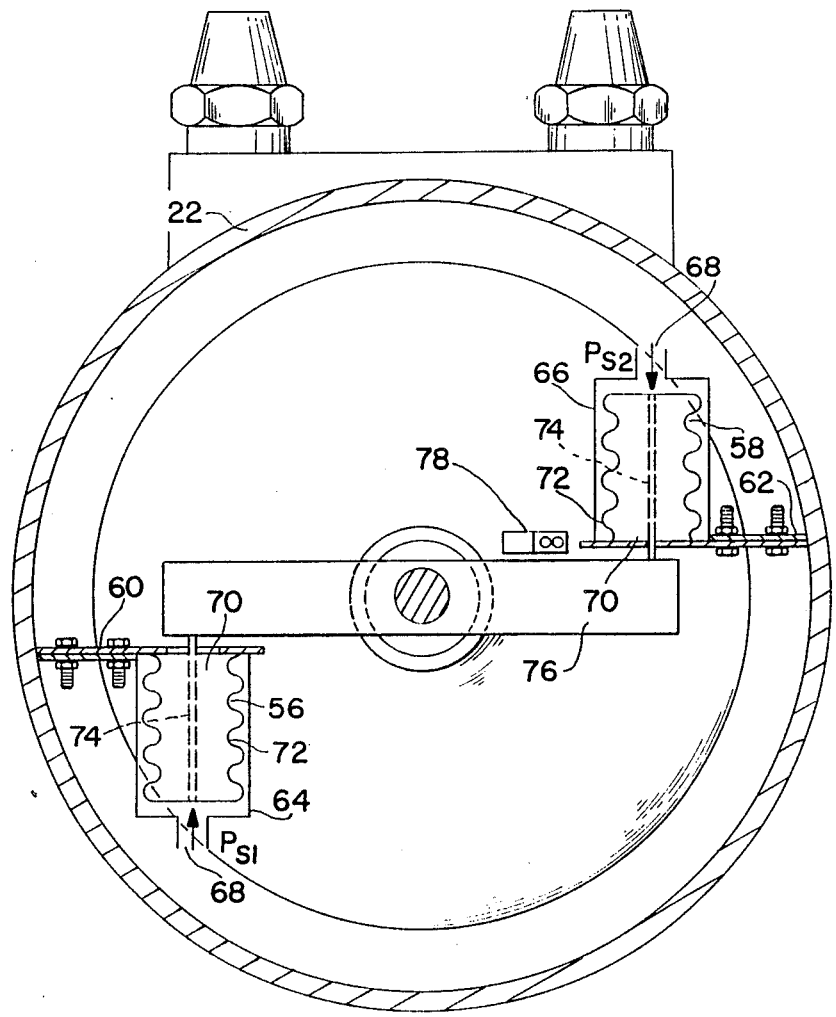
FIG. 4 illustrates in cross-section the interior of the pilot sensor stage of the embodiment of FIG. 1.

Stage III represents the sensor stage of pilot 20 wherein a pair of transducers 56, 58 are secured within housing 22. As illustrated in FIGS. 1 and 4, transducers 56, 58 are preferably of a bellows type. In FIG. 4, transducers 56, 58 are supported by respective supports 60, 62 each extending off of housing 22. Secured to supports 60, 62 are casings 64, 66 each including a fluid opening 68 and a linking opening 70. Within each casing 64, 66 is secured a flexible bellows member 72 attached to linking member 74. Bellows members 72 are preferably formed of stainless steel which ensures a long useful life for transducers 56, 58. Each linking member 74 is secured to lever 76 formed integrally with, or rigidly secured to, torsion bar 52. Linking members 74 are secured to lever 76 at opposite ends and on opposite sides such that both transducers act in tandem to rotate torsion bar 52 in a direction away from the original preset position of torsion bar 52. To prevent damage to bellows members 72 and to help in creating the initial torque in torsion bar 52, mechanical stop 78 is positioned to abut lever 76 upon reaching a predetermined amount of rotation. Stop 78 is rigidly secured to housing 22. The total torque created by the transducers is designed to balance the torque within the torsion bar 52.

Figure 6:
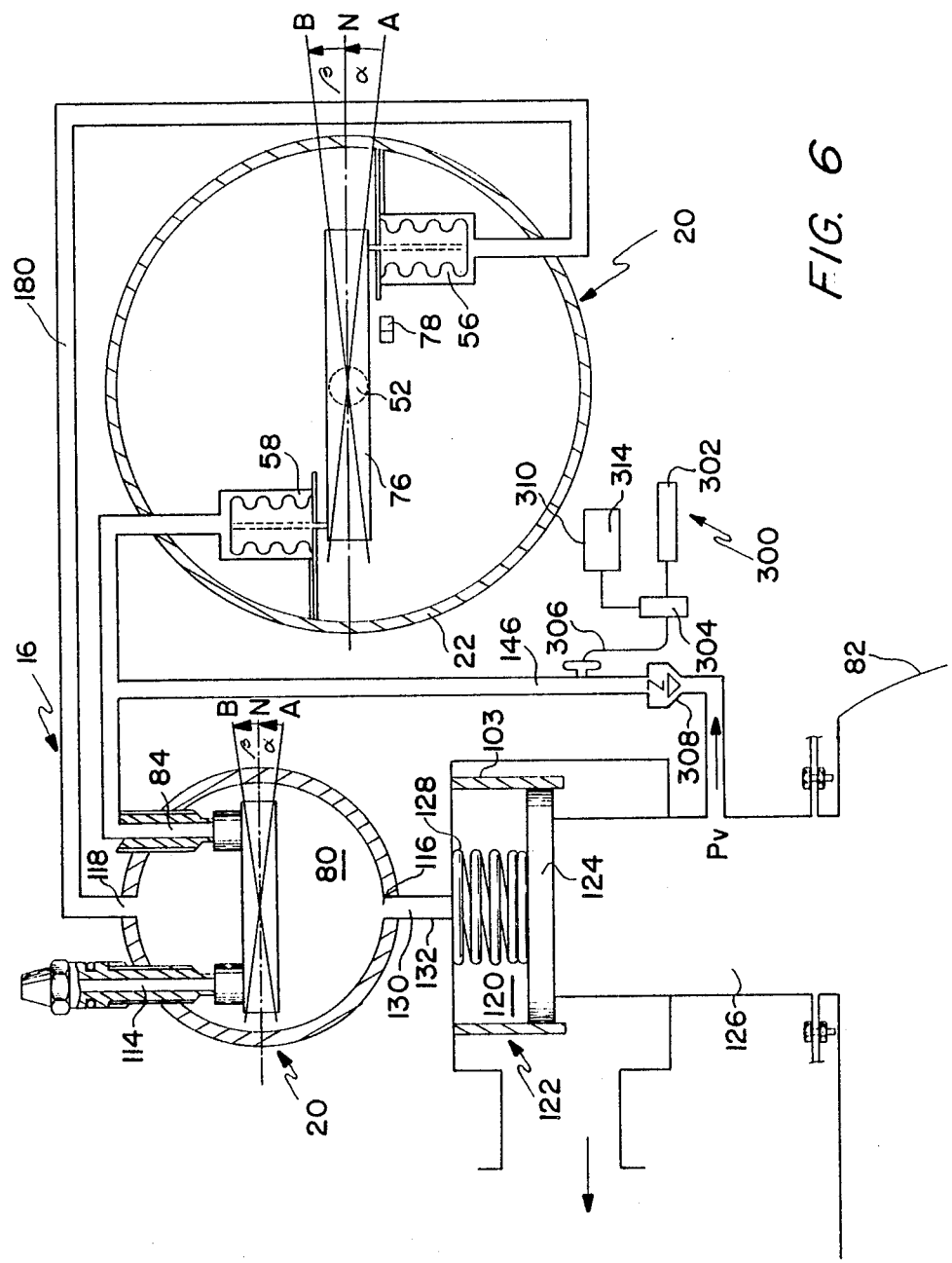
FIG. 6 illustrates schematically the piping scheme and main valve for the pilot operated relief valve in the present invention.

Transducers 56, 58 translate pressure into force and linear displacement. Fluid opening 68 in casing 64 of transducer 56 is in communication with valve chamber 80 (FIG. 6). In addition, transducer 58 is in communication with pressure vessel 82 (FIG. 6) and inlet port 84.

Figure 4A:
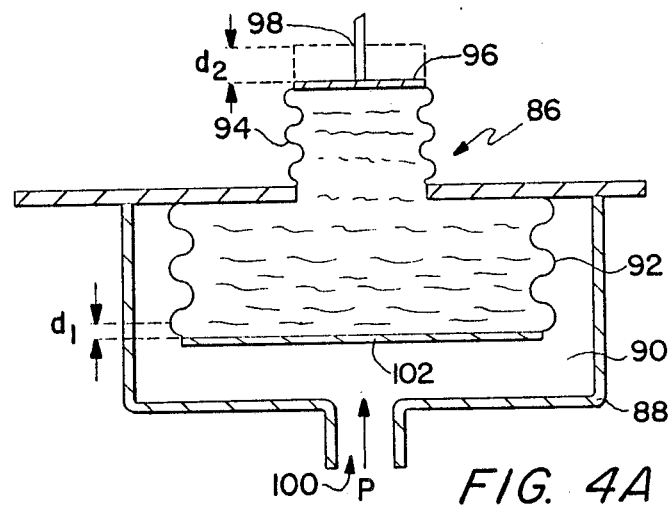
FIG. 4A illustrates a variant of the transducer featured in the embodiment of FIG. 1.

FIG. 4A illustrates an amplifying bellows transducer 86 which represents a contemplated variant for bellows type transducers 56, 58. Amplifying bellows transducer 86 includes casings 88 which are similar to those for transducers 56, 58. Within the interior 90 is a first bellows container 92 fluidly connected to a second and smaller bellows chamber 94. Covering bellows chamber 84 is a cap 96 which provides a location to which linking device 98 may attach and a seal for the liquid. The structural arrangement of transducer 86 acts to amplify any pressure variations in the fluid entering opening 100. Hence, when a rise in fluid pressure occurs in the fluid entering opening 100, cap 102 is caused to move away from the fluid source a distance d1 and the pressurization of fluid in chambers 92 and 94 results in cap 96 moving a distance d2. The amplifying effect can thus be stated as the value of d2/d1.

Figure 4B:
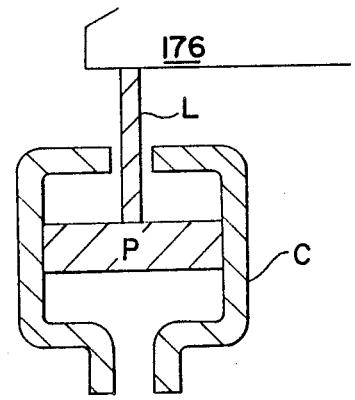
FIG. 4B illustrates another variant of the transducer featured in the embodiment of FIG. 1.
Figure 4C:
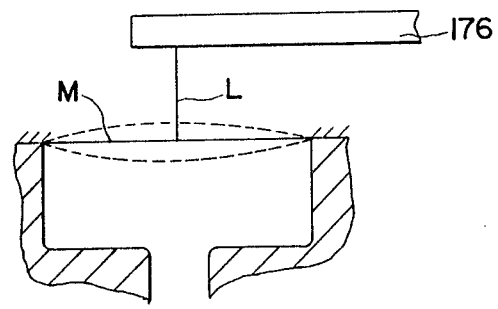
FIG. 4C illustrates another variant of the transducer featured in the embodiment of FIG. 1.

FIG. 4B illustrates a high pressure variant of the transducers shown in FIG. 1. In FIG. 4B, piston P slides within cylinder C and is connected to linking arm L which, in turn, is connected to lever 76.

FIG. 4B illustrates a cost effective variant of the transducers shown in FIG. 1. In FIG. 4 membrane M deflects pressure dependent and is connected to linking arm L which, in turn, is connected to lever 76.

Figure 5:
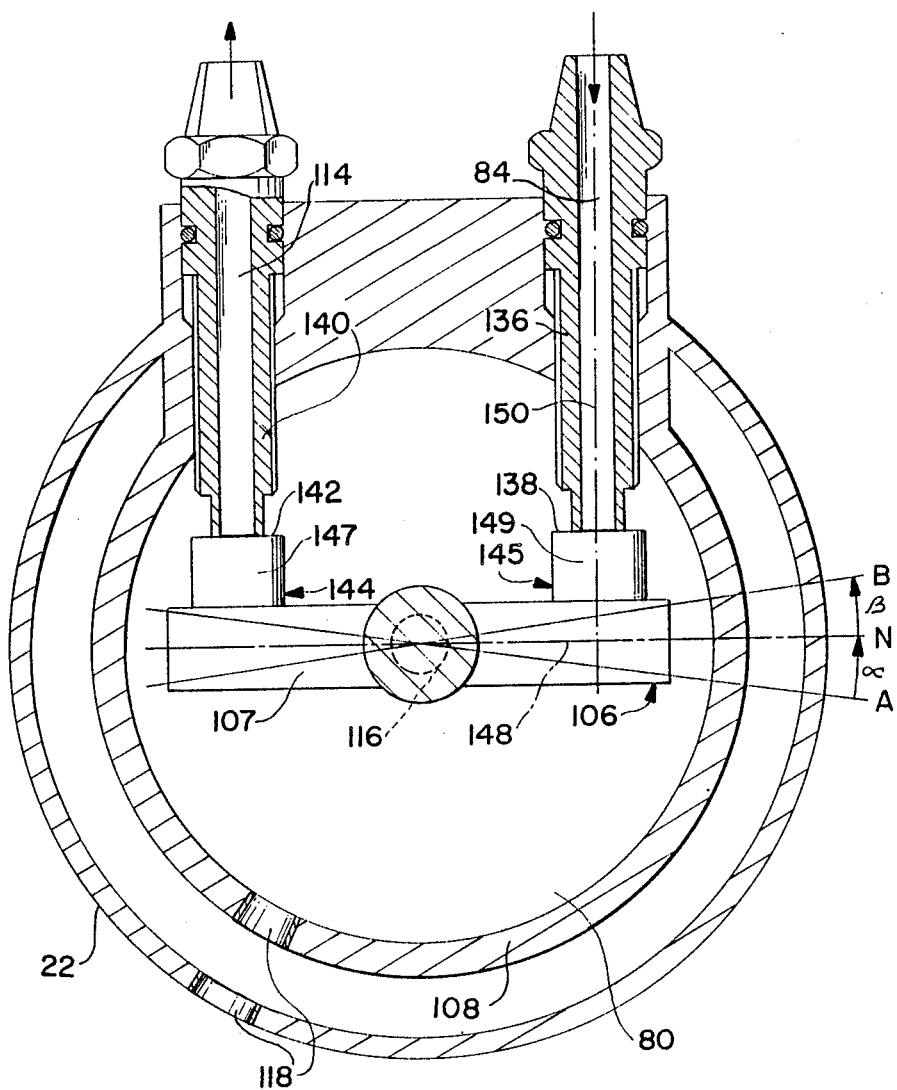
FIG. 5 illustrates in cross-section the pressure chamber of the embodiment of FIG. 1.

The fourth stage IV as shown in FIGS. 1 and 5, includes valve chamber 80 into which enlarged section 104 of torsion bar 52 extends. Integrally formed with enlarged section 104 and fixedly secured thereto is follower 106. Housing 22 of pilot 20 includes flanged sections 108 which act together to define a portion of valve chamber 80. Flanged sections 108 include bearing members 110 providing a low friction area in which enlarged section 104 rotates. Enlarges section 104 also includes a recess for receipt of O-ring 112 so as to preclude fluid flow or leakage from valve chamber 80 into chamber 50. This arrangement enables follower 106 to rotate within valve chamber in accordance with rotation of torsion bar 52 and lever 76. Additionally, bearing members 110 prevent the occurrence of large frictional forces between enlarged section 104 and flanged sections 108 in the event that out of horizontal plane force components (producing torque) might occur.

As best illustrated in FIGS. 1, 5 and 6, the portion of housing 22 which defines valve chamber 80 includes inlet port 84, vent port 114, communication port 116, and communication port 118. Inlet port 84 is in communication with both pressure vessel 82 and transducer 58. Vent port 114 opens to the atmosphere or a large volume chamber (not shown) so as to allow, in appropriate circumstances, pressure relief in -valve chamber 80. Communication port 116 is in communication with dome pressure chamber 120 defined by main cylinder 103 of main valve 122. Slidably confined within main cylinder 103 is disc (or piston) 124 which covers an outlet nozzle 126 of pressure vessel 82 to form a piston-covers-nozzle type of main valve. Disc 124 is biased by spring 128 and any fluid pressure within dome pressure chamber 120. Piping line 130 extends between communication port 116 and main cylinder 103 and includes fluid dynamic resistor 132 to provide a damping function. Fluid dynamic resistor 132 allows for increased control over a variety of different main valve sizes as well as fluids of different pressures and temperatures. More particularly, the pilot of the present invention and resistor 132 exhibit dynamic control functions on the main valve so that the pilot of the present invention can be used on a family of main valve sizes.

Inlet port 84 includes inlet valve nozzle 136 which is threadably received within inlet port 84 so as to allow for an adjustment of the degree to which nozzle end 138 extends into valve chamber 80. Similarly, vent valve nozzle 140 is threadably received within vent port 114 and nozzle end 142 can be varied in position. In addition, sealing rings 142 are provided to prevent leakage between nozzles 136, 140 and the port into which they are threaded.

FIG. 5 shows covering means 144, 145 comprising elastic pads 147, 149 arranged on a common side and at opposite ends of follower 106 so as to be in position to cover nozzle ends 138, 142. Pads 147, 149 may be formed of a material such as rubber or plastics which have proven to provide adequate sealing functions over long periods of time. When follower 106 is in the position denoted N, both inlet and vent valve nozzles 136, 140 are closed and leaktight due to elastic pads 144, 145 being partially compressed over ends 138, 140. The position indicated as N represents a neutral position for follower 106. Two other extreme positions A and B are also shown in FIG. 5. Position A represents a position wherein follower 106 is rotated towards vent valve nozzle 140 and away from inlet valve nozzle 136. This allows the fluid pressure of vessel 82 to enter into valve chamber 80 through line 146 (FIG. 6).

Position B represents a position in which elastic pad 145 is highly compressed over nozzle end 138 and elastic pad 144 no longer covers nozzle end 142 such that pressurized fluid in chamber 80 is released to the atmosphere through vent valve nozzle 140. In the embodiment shown in FIG. 5, center line 148 of follower 106, when in a neutral position, is at right angles to center line 150 of each of the nozzles 136, 140. If the situation warrants, however, center line 148 may form other than a right angle to center line 150.

Figure 2:
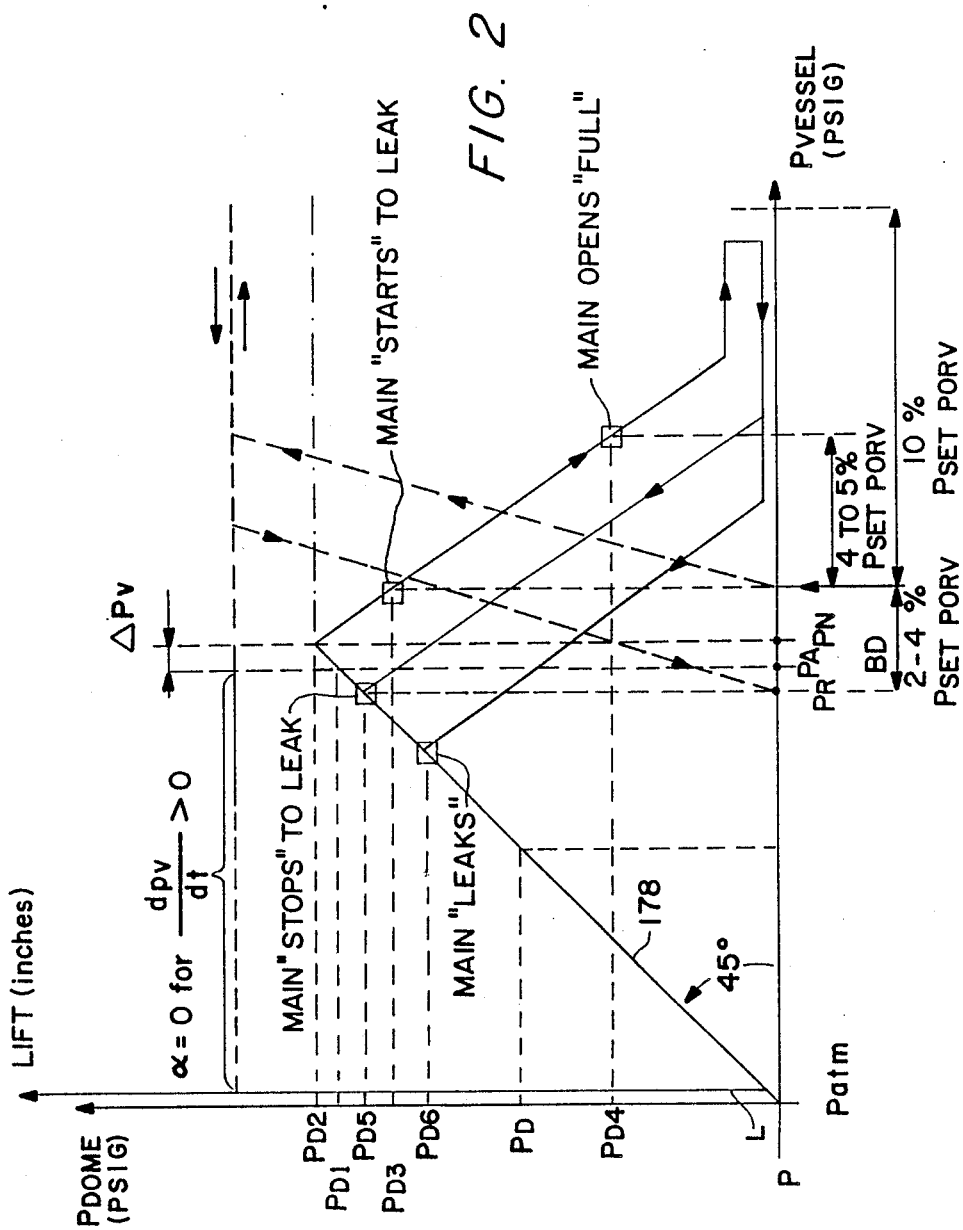
FIG. 2 illustrates a functional diagram with the dome pressure and lift along one axis and the pressure of the vessel along the other axis.
Figure 2A:
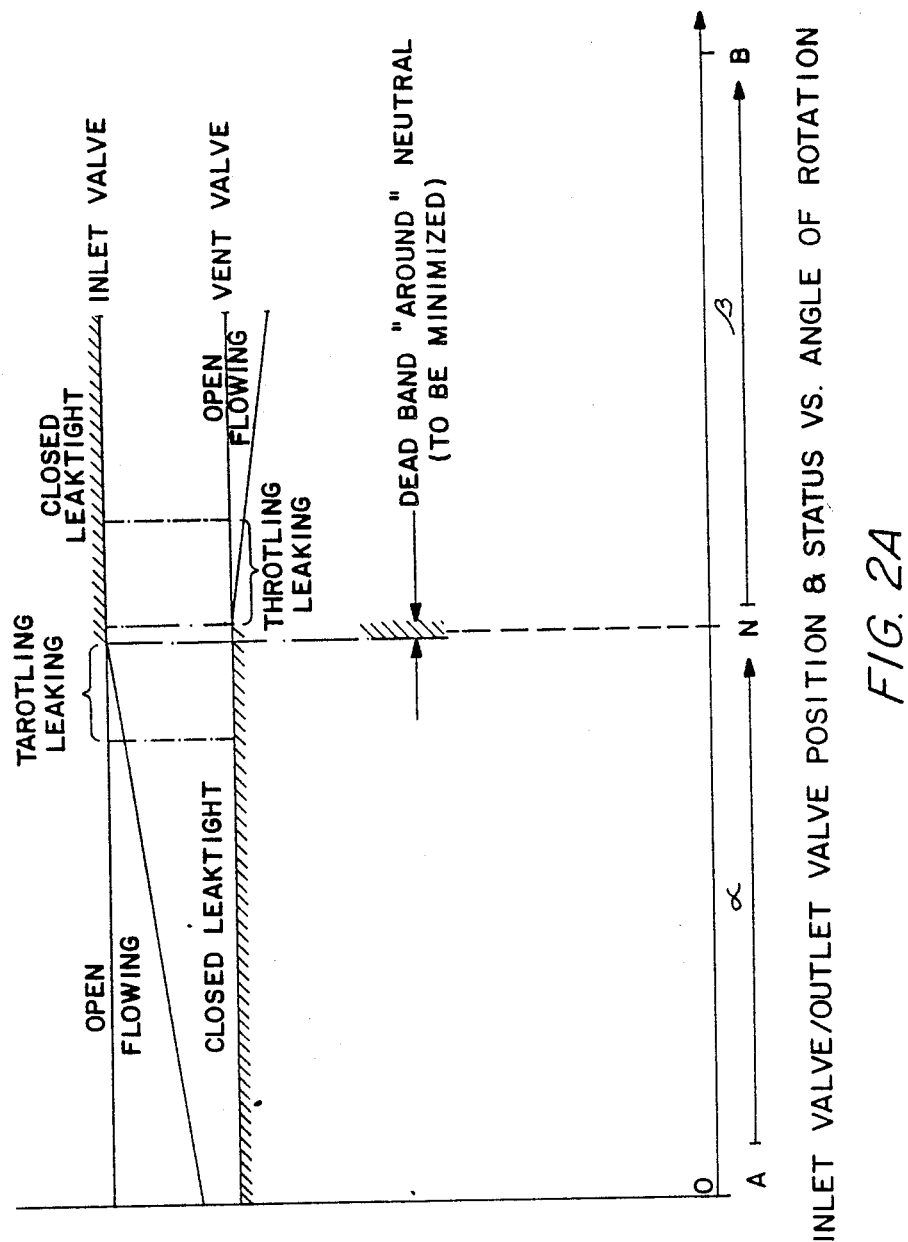
FIG. 2A illustrates graphically the inlet/outlet valve position in relation to the angle of rotation.

FIG. 2A represents graphically, the relationship between the condition of valves 136, 140 and the positioning of follower 106. As can be seen there exists periods when one of each of the valves is closed leaktight while the other is in a throttling-leakage position.

Figure 5A:
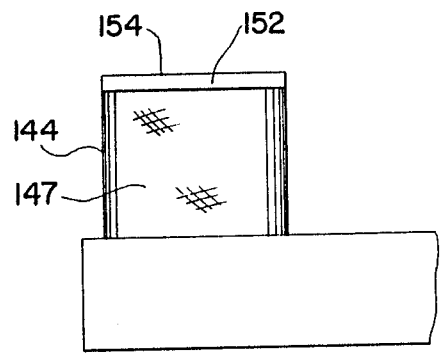
FIGS. 5A-G illustrate in cut-away variants of the inlet and outlet closures featured in the embodiment of FIG. 1.

In FIG. 5A there is shown an alternate embodiment for covering means 144, 145 wherein elastic pads 147, 149 ar covered with metal disc 152 which preferably includes lapped surface 154.

Figure 5B:
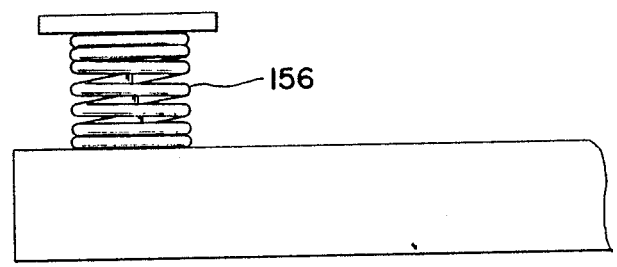
Figure 5C:
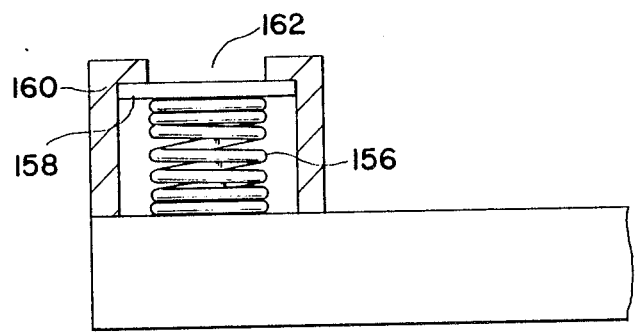

FIG. 5B shows another embodiment for covering means 144, 145 which includes spring 156 and attached lapped metal disc 158. FIG. 5C represents yet another embodiment of covering means similar to that of FIG. 5B except that spring 156 and disc 158 are confined within retainer 160 having an upper opening 162 smaller than the surface area of disc 158.

Figure 5D:
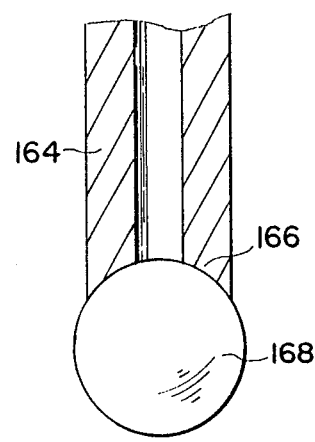
Figure 5E:
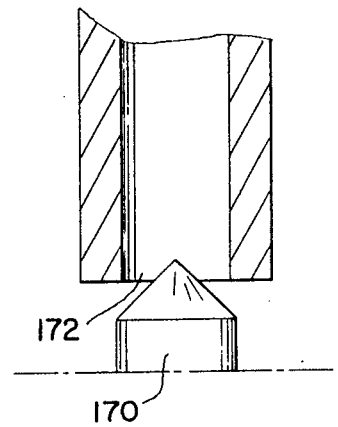

FIGS. 5D and 5E show still further embodiments of covering means 144, 145. The embodiment shown in FIG. 5D includes nozzle 164 with concave end 166. Bearing ball 168 is connected to lever 106 and sized to be received within concave end 166 in a sealing fashion. FIG. 5E shows utilization of conical poppet 170 to provide a way to block nozzle end 172.

Figure 5F:
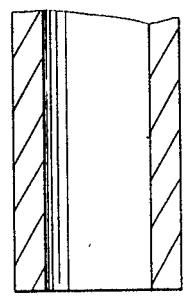
Figure 5G:
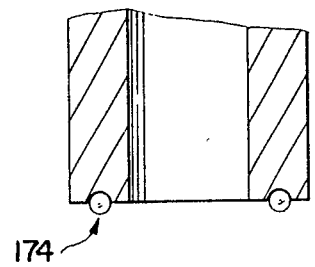

FIG. 5F shows a "soft" seated valve nozzle end 174 which includes an O-ring 176 fixedly received within a recess formed in nozzle end 174. The lever may include a raised surface to provide an appropriate sealing contact.

FIG. 2 illustrates graphically the modulation features of the present invention. In FIG. 2 the vertical axes represent the lift or clearance which disc 124 (FIG. 6) assumes with respect to the free edge of outlet nozzle 126 and the dome pressure chamber 120. The horizontal axis represents pressure within vessel 82. Further discussion of FIG. 2 will appear further in discussing the operation of the invention.

As previously noted, FIG. 6 illustrates the piping scheme of a preferred embodiment of the invention which relies on the four-stage pilot depicted in FIG. 1. Reference to FIG. 6, in particular, is made as the following explanation is given for the pressure operating relief valve 16 with its pilot component 20 and main valve component 122. Initially, torsion bar 52 is positioned, in the manner previously explained, to have locked in an initial torque value. The value of the initial torque is dependent upon the amount torsion bar 52 is rotated while in abutment with mechanical stop 78. As lever 76 is in abutment with mechanical stop 78, center line 148 of follower 106 (FIG. 5) is in position A. The initial state of the various components while the invention is in position A appear as follows.

(a) Main valve 122 is closed due to pressure in dome chamber 120 and the biasing force of spring 128 forcing disc 124 into contact with nozzle outlet 126.

(b) Vent valve nozzle 140 is closed and inlet valve nozzle 136 is open.

(c) Lever 76 is resting on mechanical stop 78 with the bellows of transducers 56, 58 in outstretched position.

(d) Torsion bar 52 is under initial (dialed or adjusted) torque.

(e) There exist atmospheric pressure throughout the system including pressure vessel 82.

When the pressure in vessel 82 rises to a level greater than atmospheric pressure but less than that required to cause transducer 58 to impart sufficient force to lever 76 to release 76 from its original position A (i.e. $P_v < P_A$), the fluid of vessel 82 remains in communication with valve chamber 80. In other words, fluid from pressure vessel 82 enters chamber 80 through line 146 due to inlet valve nozzle 136 being open. Because vent valve nozzle is closed at this stage dome pressure $P_D$ is essentially identical to vessel pressure $P_v$. FIG. 2, illustrates this graphically with 45° line 178. Dome pressure $P_D$ acts to further load spring pre-loaded disc 124 and the applied pressure (lines 146 and 180) on transducers 56 and 58 remains insufficient to create a torque in lever 76 which is sufficient to overcome the initial (set) torque valve. Hence, lever 76 remains in abutment with mechanical stop 78.

For further increasing vessel pressure ($P_A < P_V < P_N$) the torque created by the two transducers 56, 58 overcomes the initial (set) torque and rotates the lever and follower from A towards N. The contact between lever 76 and mechanical stop 78 is thus lost at this point. Additionally, vent valve nozzle 140 remains closed (although the compression in elastic pad 147 decreases) and inlet valve nozzle 136 becomes covered. With increasing vessel pressure, lever 76 eventually moves into the neutral or N position whereon both inlet and vent valve nozzles are in a closed state. Main valve 122 also remains in its closed position as the spring load and $P_D$ pressure act to keep cover 124 in contact with outlet nozzle 126. FIG. 2 shows, for this state of the system, $P_V = P_N$; $P_V = P_D$ and, concurrently, the lift vs. vessel pressure graphic in FIG. 2 (L Vs Pv) which indicates zero lift (L=0).

For still further increasing vessel pressure ($P_N < P_V$), transducer 56 which is initially in a "locked" pressure $P_N$ state senses the rise in pressure and subsequently acts to rotate both lever 76 and integrally attached follower 106 further away from neutral $P_N$. That is, the degree of rotation exceeds $\theta = \alpha$. At the time the pressure in the vessel is sufficient to cause lever 76 to rotate into position B ($0 - \alpha + \beta$), inlet valve nozzle 136 remains closed while vent nozzle 140 opens. Consequently, the "locked in" fluid pressure within chamber 80, dome pressure chamber 120, line 180 and transducer 56 is released to the atmosphere. This discharge reduces the dome pressure $P_D$ such that the pressure acting upon transducer 56 is lowered allowing for rotation of lever 76 back towards the neutral position N.

In FIG. 2, it can be seen that for increasing vessel pressure a decreasing dome pressure (or negative slope line $P_D$ vs. $P_V$) is the resultant of the aforementioned "oscillations" of the lever and follower from neutral N to B and back to neutral N. Eventually, the equilibrium of forces acting o the main valve disc 124 vanishes and consequently disc 124 will move and the main valve 122 will start to open exhibiting a proportional lift L as shown in FIG. 2. This is the "modulating" operation mode of the main valve, meaning a proportional opening of the main (due to a dome pressure decrease) which in turn is proportional to the amount of overpressure.

The proportionality or modulating range is maximized in reference to the vessel pressure value at which the main starts to leak referred to in FIG. 2 as the set pressure of the P.O.R.V. ($P_S$). The modulating range (4 to 5% of $P_S$) ceases when the main valve disc impinging forces overcome, in totality, the opposing force created by the dome pressure $P_D$ and spring 128 causing disc 124 to lift off outlet nozzle 126 (lift $L \geq D/4$ with D representing the main nozzle diameter). Thus, the pilot operating relief valve of the present invention has a pilot with a short blowdown of the main valve wherein there exists a difference as small as 2% between the main valve start-to-leak vessel pressure and the vessel pressure involved in a full valve lifting cycle which reaches maximum massflux through the main valve at linear lift values of approximately one quarter of the main valve nozzle's minimum bore diameter.

The main valve discharges product through the main valve outlet (see FIG. 6) and eventually the vessel pressure starts to decrease during this time. The main valve remains full open until the decreasing vessel pressure reaches a value low enough to cause transducer 58 to produce a torque which is insufficient to hold the follower 106 and lever 76 in the B position ($\theta = \alpha + \beta$). The torsion bar will thus return the lever 76 and follower 106 from position B (inlet closed, vent open, see FIG. 6) to position N - neutral (both valves closed). The main valve continues to discharge and thus to reduce the vessel pressure. The further reduced vessel pressure is sensed by transducer 58 and consequently the torsion bar initial torque moves the lever and follower from position N to A. The result is that the inlet valve opens, a quantity of fluid penetrates into the valve chamber, refilling it, but also increasing the pressure acting inside the dome and line common to transducer 56. This feedback returns the lever and follower back to N, thus creating an oscillatory motion N-A-N in the lever and follower (having a variable amplitude and frequency). This oscillatory motion N-A-N is the dynamic system response to the decreasing vessel pressure signal. The dome pressure $P_D$ increases in proportion with the decreasing vessel pressure. Eventually, the dome pressure $P_D$ and spring force will start to decrease the main valve lift L for decreasing vessel pressure. The pilot device of the present invention repeats the above noted sequence in a manner causing the torsion device to develop an oscillating angular motion having the sequence A-[N-B-N]-[N-B-N]-[N-B-N]...-B-N-A-[N-A-N]-[N-A-N]-[N-A-N]...-N-A.

FIG. 2 shows two branches X and Y of $P_D$ vs. $P_V$ during $dp_V/dt < 0$ (decreasing pressure vessel). When the hysteresis is small, the branch X will intersect with the 45 degree $P_D = P_V$ characteristic and the dome pressure can be larger than the dome pressure existent when the main valve started to leak due to increasing vessel pressure. Thus, for a relatively small hysteresis the main valve recloses. If a wide hysteresis is designed (branch Y in FIG. 2) the main valve closes, but leaks if no supplementary device is used to decrease the vessel pressure. FIG. 2 shows that if the vessel pressure does not increase beyond the 4 to 5% proportionality range, but the main valve intermediate opening reduces the vessel pressure, the operating point of the pilot can jump from the decreasing $P_D$ vs. $P_V$ characteristic to branch X. A sudden (step function) vessel pressure, which does not allow timewise the oscillations needed to decrease or increase the dome pressure, will open the main disc 124 to full lift and thus provide a "snap" action in the present invention. The present invention exhibits a full lift popping action if the vessel pressure increases suddenly with a response time essentially the same as that of a self-activated spring loaded pressure relief valve (.e.g., less than 50 milliseconds.

FIG. 1 shows a miniature rupture disc 182 located in one of flanges 108 of housing 22. Under any circumstance should the vessel pressure rise above a predetermined value (e.g. 15%) of the set pressure, the rupture disc will rupture and discharge the dome content through hole 184 in chamber 50 causing the pilot operated relief valve to fail open.

Figure 8A:
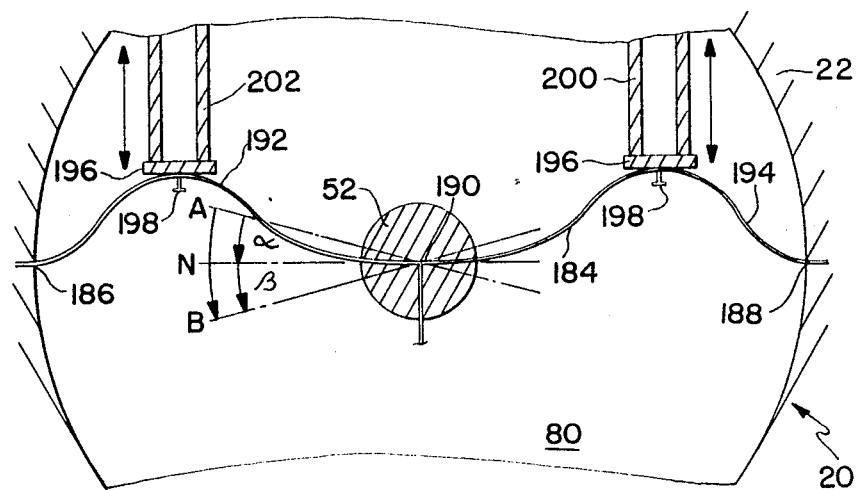
FIGS. 8A-C illustrate in cross-section a second embodiment of the non-flow modulating pilot valve in a variety of positions.
Figure 8B:
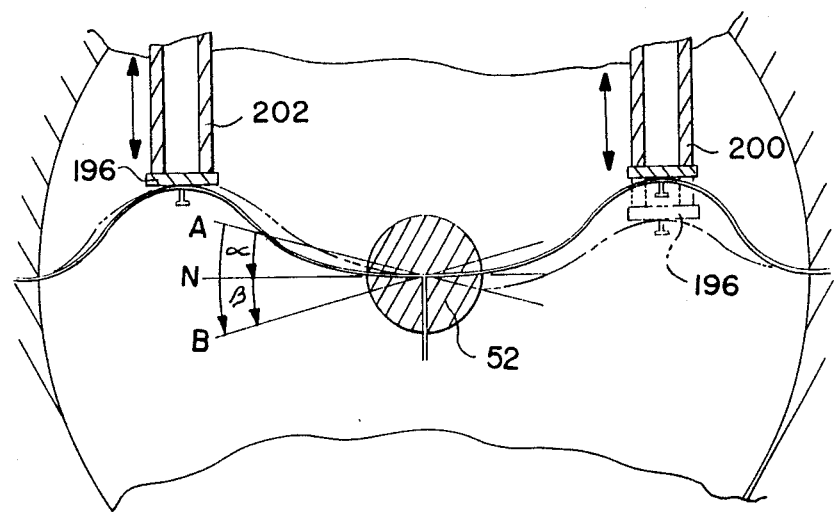
Figure 8C:
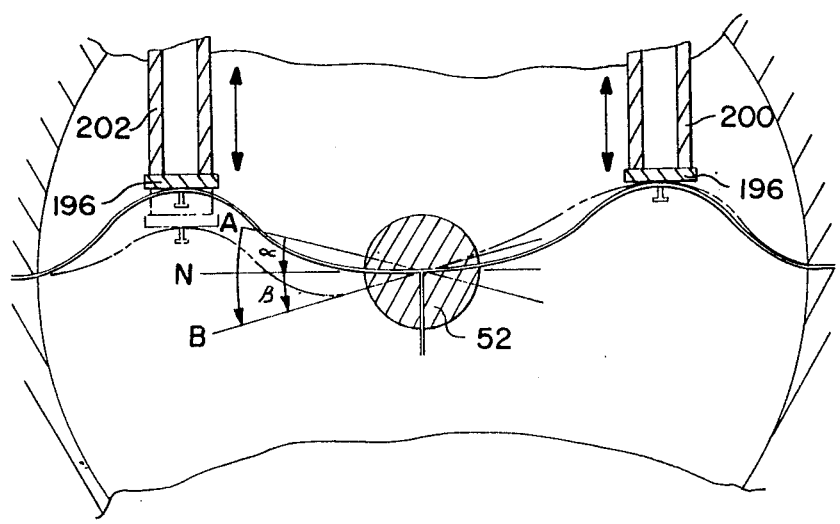

In the embodiment represented in FIG. 1, the follower 106 is shown to be rigid while covering means 144, 145 (FIG. 5) is depicted as being elastic in nature. FIGS. 8A-C represent another embodiment of the present invention wherein the entire fourth stage (IV, FIG. 1) of pilot 20 includes an elastic blade 184 which replaces the rigid follower bar 107 and attached elastic covering means 144, 145. FIG. 8A shows elastic blade 184 as being secured at ends 186, 188 to housing 22 of pilot 20. Blade 184 is preferably formed to have an essentially sinusoidal configuration. The mid-region 190 of blade 184 is releasably locked to the end of torsion bar 52 which is positioned within chamber 80. Blade 184 is preferably formed of carbon steel or beryllium copper having a width of about 2¼ inches maximum and a thickness of about 0.300 inches maximum.

Attached to the peak portions 194, 194 of sinusoidal shaped blade 184 are closing means 196 which are shown to be metal discs in FIGS. 8A-C. Closing means 196 are fixed to blade 184 by connectors 198 in a manner which allows for a limited degree of rocking motion.

FIG. 8A shows the fourth stage of pilot 20 in the neutral position N wherein both inlet valve nozzle 200 and vent valve nozzle 202 are closed.

FIG. 8B shows in dashed lines blade 184 in the configuration it assume for position A. In position A inlet vent nozzle 200 is open and vent valve nozzle 202 is closed.

FIG. 8C shows in dashed lines blade 184 in the configuration it assume for position B. In position B inlet vent nozzle 200 is closed and vent valve nozzle 202 is open.

The elasticity inherent over the length of blade 184 allows blade 184 to achieve the same kinematic functions. (i.e. opening and closing of the inlet and vent valves) as was achieved by the combination of rigid follower bar 107 and elastic covering means 144, 145 in the first embodiment of FIG. 1.

The previous discussion for FIG. 1 indicates that the torsion bar functions to provide mechanical support for the additional components of torsion device 40 and a means to adjust for an initial torque valve.

Figure 9:
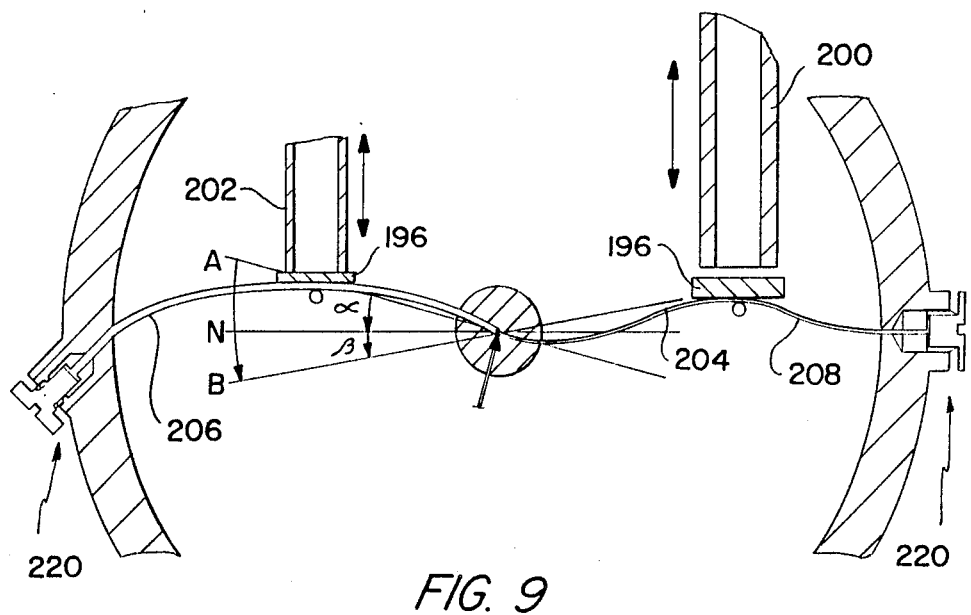
FIG. 9 illustrates in cross-section a third embodiment of the non-flow modulating pilot valve.

In another embodiment shown in FIG. 9, the role and function of torsion bar 52 is achieved by substituting, in place of torsion bar 52, non-symmetric follower 204.

Figure 12:
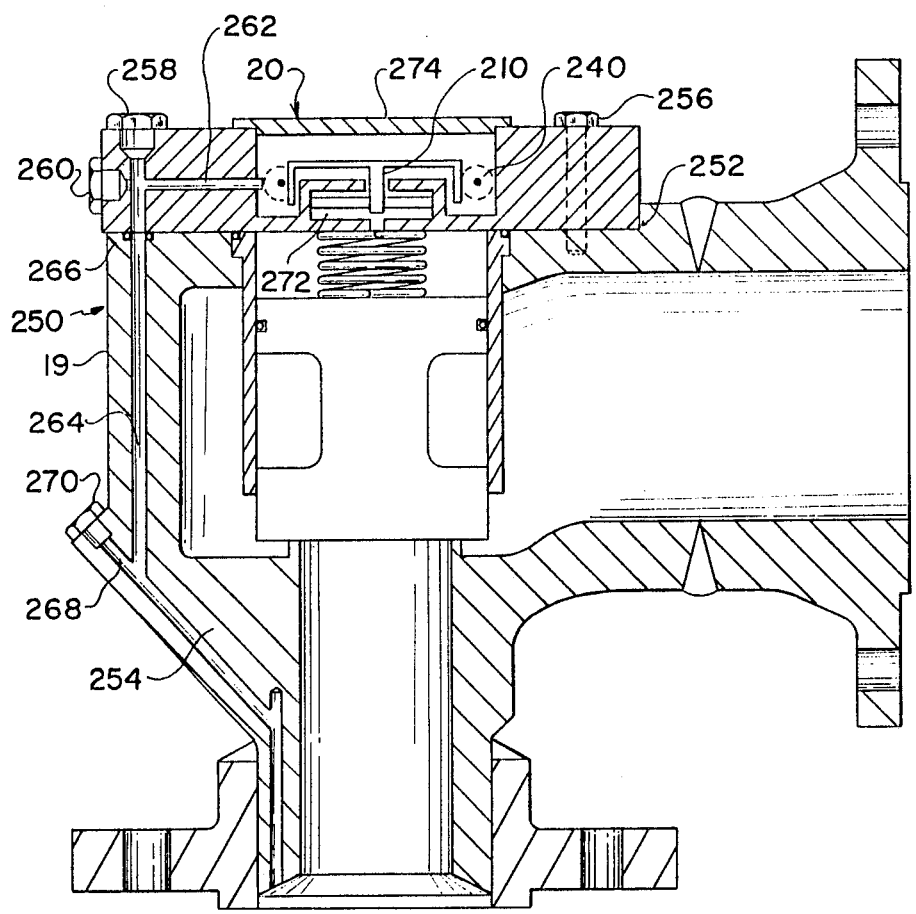
FIG. 12. illustrates in vertical cross-section the embodiment of FIG. 11 in position with a preferred embodiment of the main valve.

Non-symmetric follower 204 includes blade section 206 having a higher modulus of elasticity than blade section 208. Blade sections 206 and 208 are shown in FIG. 9 to be integral and attached to one end of intermediate member 210 (FIG. 12).

The non-symmetry in the blades provides a function similar to the placement of an initial torque in torsion bar 52 That is, the inlet valve is initially biased open (position A) and the vent valve closed. Rotation of intermediate member 210 results in movement of blade 204 into an inlet valve closing position. However, because blade 206 is not as easily flexed it remains in inlet valve closed position thus achieving position N with both the inlet and vent valve in closed position. When the pressure in the vessel is high enough, the additional stiffness of blade 206 is overcome and intermediate member 210 is rotated to a point where blade 206 is moved away from the vent valve closed position (i.e. position B).

A suitable material for blades 206 and 208 includes carbon steel. Moreover, to achieve the difference in stiffness values it is possible to use similar materials for both blade sections with one section having a different thickness. In a preferred embodiment, the carbon steel blade 206 has a thickness of about 0.200 of an inch and blade 208 has a thickness of about 0.07 of an inch. Various other arrangements to achieve the differences in elasticity are also possible including use of different materials.

Figure 10:
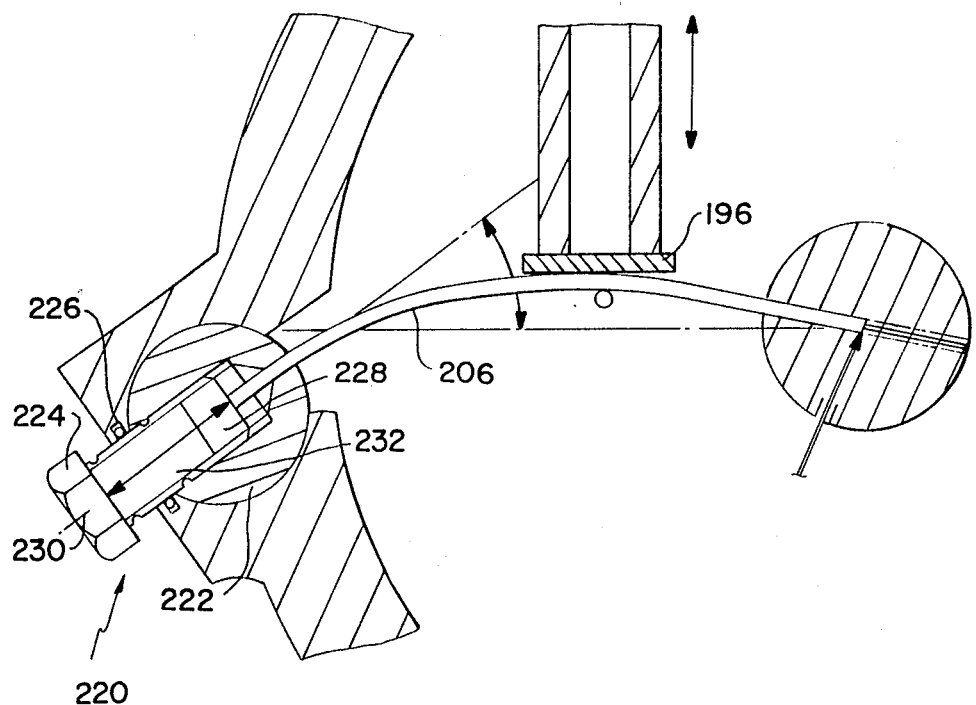
FIG. 10 illustrates an enlarged view of the adjustment means of the embodiment of FIG. 9.

FIG. 9 and, in more detail, FIG. 10 illustrate adjustment device 220 positioned within a thickened portion of housing 22. Adjustment device 220 includes half-split cylinder 222 and screw 224. Half-split cylinder 222 is rotatively secured within a recess in housing 22 and O-rings are provided in recess 226 to ensure no fluid leakage about adjustment screw 224. Screw 224 is threadably received within half split cylinder and includes rotating member 228. Blades 204, 206 push outwardly against rotating member 228. Rotating member 228 moves along the longitudinal axis 230 of screw 224 adjusting the length of the blades 204, 206. The half-split cylinder 222 is locked via a lock-nut similar to locking nut 238 shown in FIG. 11 to provide blades with adjustable cantilever angle α. Adjustment device 220 provides a means for achieving the appropriate set pressure in the system. In other words, by changing the degree of curvature of each blades 204, 206 variations in the amount of torque required to move closing means into and out of position over respective nozzles 200, 202 are possible. Half-split cylinder 222 and adjustment device 220 allow for the end of each of blades 204, 206 to assume the necessary degree of initial curvature and initial adjustable torque.

Figure 11:
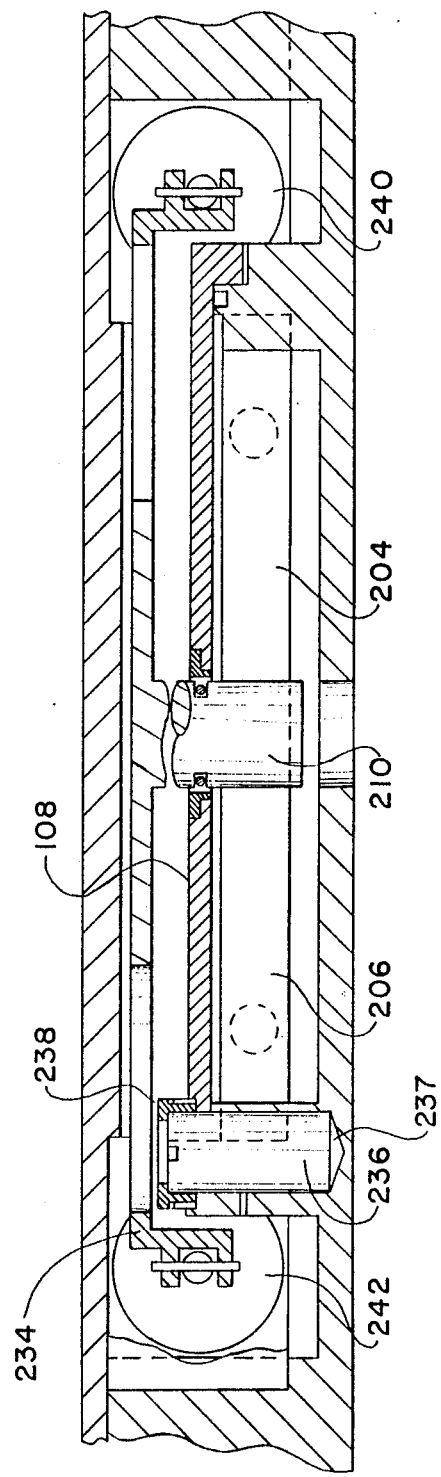
FIG. 11 illustrates in vertical cross-section a fourth embodiment of the non-flow modulating pilot valve.

FIG. 11 illustrates a compacted embodiment of the invention having only two stages as opposed to the four stages (I–IV) in FIG. 1. As illustrated in FIG. 12, this compactedness makes it possible to "sink" pilot 20 into main valve 19, thus allowing for use of the invention in positions heretobefore not possible giving a designer more freedom in designing piping systems and the like. The embodiment of FIG. 11 relies on non-symmetrical blades 204, 206 which, in addition to their biasing function provide support for intermediate member 210 and circular flat disc 234. Instead of a flat disc there can be utilized a reversed cup having a large diameter base in relation to the height of the sides of the cup. Adjustment device 236 includes a rotating half- split cylinder 237 into which one end of blade 206 is secured. A lock-nut 238 is fixed to flange 180 and maintains half-split cylinder 237 in position. Variations in the curvature of blade 206 ar thus made possible by rotating cylinder 237 and the locking it in position with lock-nut 238.

Transducers 240, 242 are connected to flat disc 234 and play the same role as the transducers for the previously discussed embodiments. The piping scheme is generally the same as that illustrated in FIG. 6.

FIG. 12 show pilot operated relief valve 250 having pilot 20 sunk into reception area 252 of casing 254. Housing 256 of pilot 20 includes plugs 258, 260 plugging conduit 262. Additional conduit 264 is formed within casing 254 and arranged so as to align with conduit 262. O-rings 266 ensure that leakage between casing 254 and housing 256 does not take place. Conduit 264 includes offshoot 268 covered by plug 270. The combination of conduits 262 and 264 provides an internal flowpath for communicating vessel pressure ($P_V$) to transducer 242. Moreover, transducer 240 is in communication with valve pressure chamber 272 as in the other embodiments. A field cover 274 is releasably secured over pilot housing 256 to allow for easy field service and set pressure adjustment.

FIG. 6 further illustrates field testing apparatus 300 which enables field testing of the pilot operated relief valve 16 without opening main valve 122. Field testing apparatus 300 includes pressurized fluid source 302 connected with solenoid valve 304. Extending from solenoid valve 304 to pressure vessel line 146 is conduit 306. Check valve 308 is positioned within pressure vessel line 146 and upstream from the point where conduit 306 connects with line 146.

Solenoid valve 304 electrically communicates with field test system 310 which includes pressure system main frame computer 314.

In use, mainframe computer 314 provides a digital signal which, in turn, triggers an analog or digital signal which triggers an analog or digital low voltage electrical signal that causes solenoid valve 304 to assume an open position. Once solenoid valve 304 assumes an open position, pressurized fluid from source 302 passes through conduit 306 and into line 146 so as to cause check valve 308 to block the portion of line 146 in communication with pressure vessel 82. At the time of field testing, follower 106 is in position A with vent port 114 closed and inlet port 84 open. The pressurized fluid originating from source 302 creates a higher pressure in valve chamber 80 which is detected by transducer 56. Transducer 56 acts to force torsion device 40 in a direction opposite to the initial preset torque. Measurements of the pressure being introduced artificially from source 302 into line 146 and valve chamber 80 are taken at the time the "locked" fluid within pilot 20 is first relieved to the atmosphere via vent port 114. These measurements, taken at the "start-to-vent" point, may be taken by appropriate sensors (not shown) in communication with computer 314.

The start-to-vent pressure of the artificially introduced fluid which is in valve chamber 80 and line 146 provides a good approximation of the "start-to-leak" main valve or pilot operated relief valve set pressure. Accordingly, field testing is made easily and quickly without opening main valve 122. Also, computer 314 can be programmed to make field tests periodically and to activate a warning device (not shown) if start-to-vent pressure is not within a predetermined pressure range.

In lieu of a remote computer 314 and solenoid valve 304 it is possible to rely on a hand operated valve (not shown) in association with a pressure indicator such as a Bourdon pressure gauge. The hand operated valve is positioned in line with conduit 306 and when opened (e.g. by rotation) fluid enters conduit 146 and places check valve 308 into closed position. Pressurized fluid is introduced into main valve chamber 80 until the artificially introduced pressure is sufficient to cause the fluid within chamber 80 to start-to-vent. The start-to-vent pressure is then read using the pressure gauge which can also be positioned in line with conduit 306.

Figure 13:
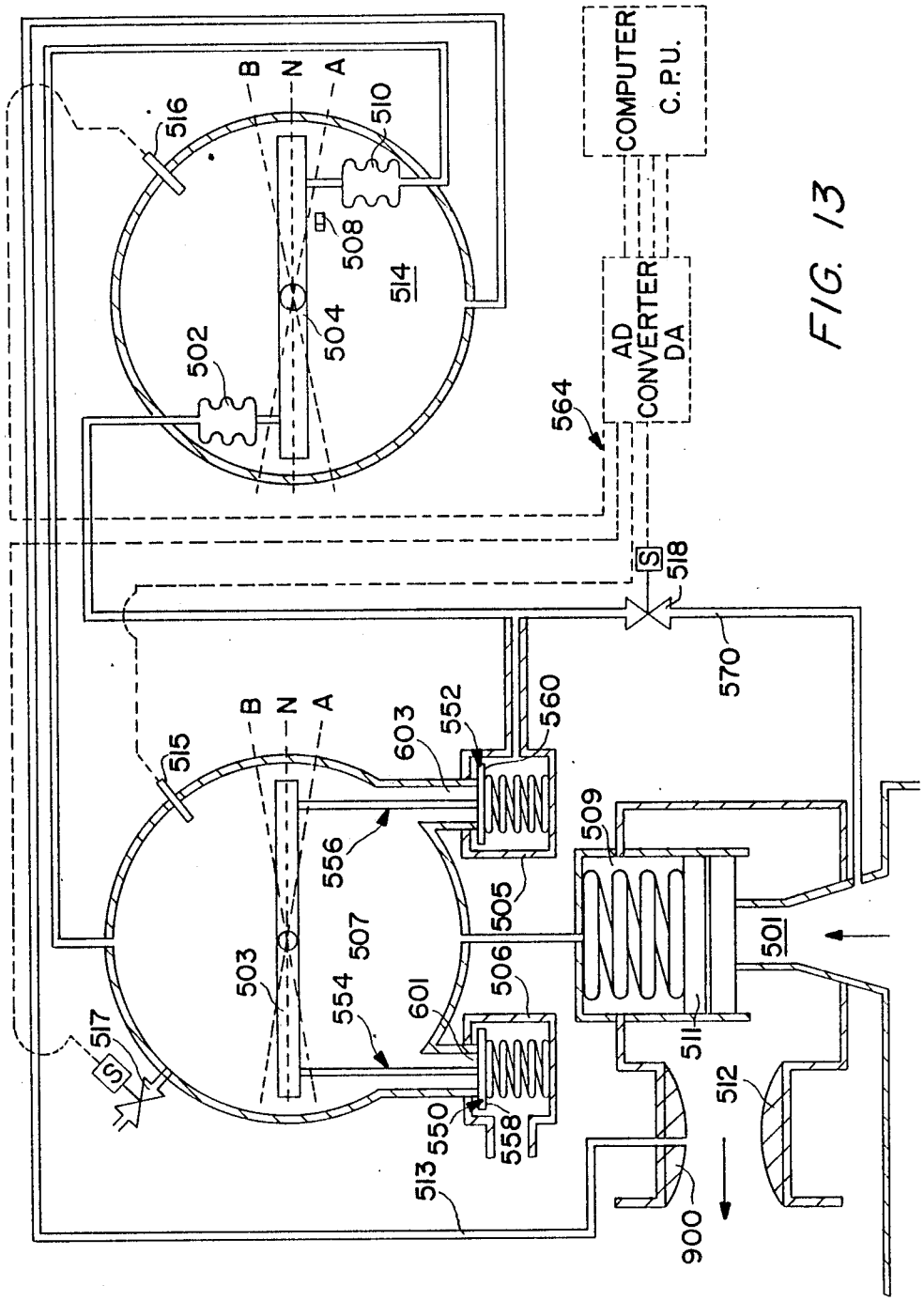
FIG. 13. illustrates schematically the piping scheme with two pressure feedbacks, two electrical pressure feedbacks and solenoid valve control, as well as the externally located biasing mechanism of the inlet/vent valves.

FIG. 13 shows another embodiment of the invention which is especially suitable for use in pressure systems handling corrosive fluids. In FIG. 13, biasing mechanisms 550 and 552 are positioned externally of the controlled pressure chamber and within inlet extension chamber 505 and vent extension chamber 506. Extension chambers 505 and 506 extend outwardly away from inlet port 603 and vent port 601. Biasing rods 554 and 556 each have one end securely connected to a respective end of follower 503 and the other end in contact with valve covers 558 and 560. When the follower arm 503 is in position N as shown in FIG. 13, valve covers 558 and 560 are biased into valve closure position by a spring (or the like) positioned within extension chambers 505 and 506 and below covers 558, 560. If follower arm 503 moves from N to A, inlet valve 603 is biased open while vent valve 601 remains shut. If follower arm 503 moves from N to B, vent valve 601 is biased open and inlet valve 603 is biased shut.

Figure 14:
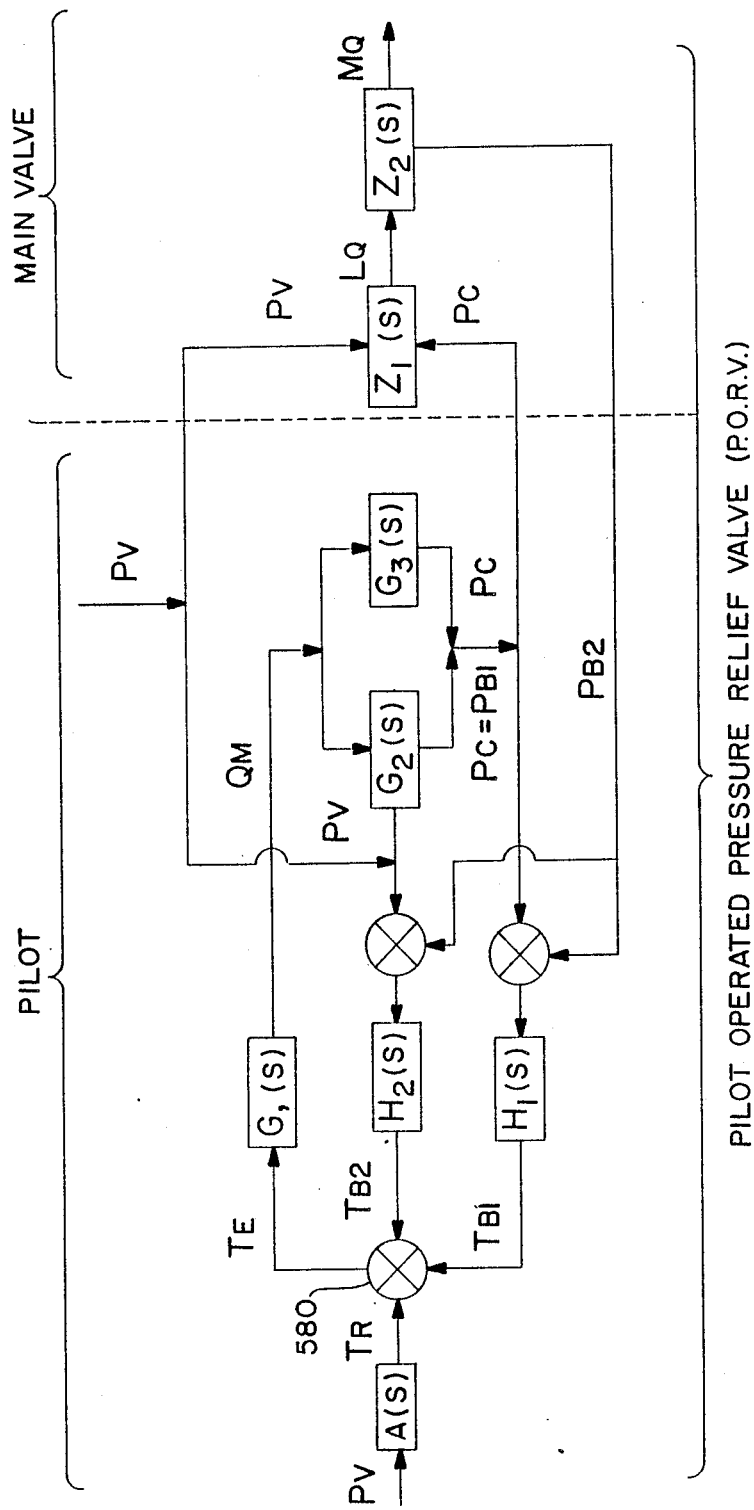
FIG. 14. illustrates the operation block diagram of the closed loop feedback control system for use with a non-flowing modulating pilot operated pressure relief valve.

FIG. 14 shows an operation block diagram of the closed loop double feedback control system for use with a non-flowing modulating pilot operated pressure relief valve like that illustrated in FIG. 13. In FIG. 13 closed loop double feedback control system 564 is shown, for the most part, in phantom lines.

Figure 15:
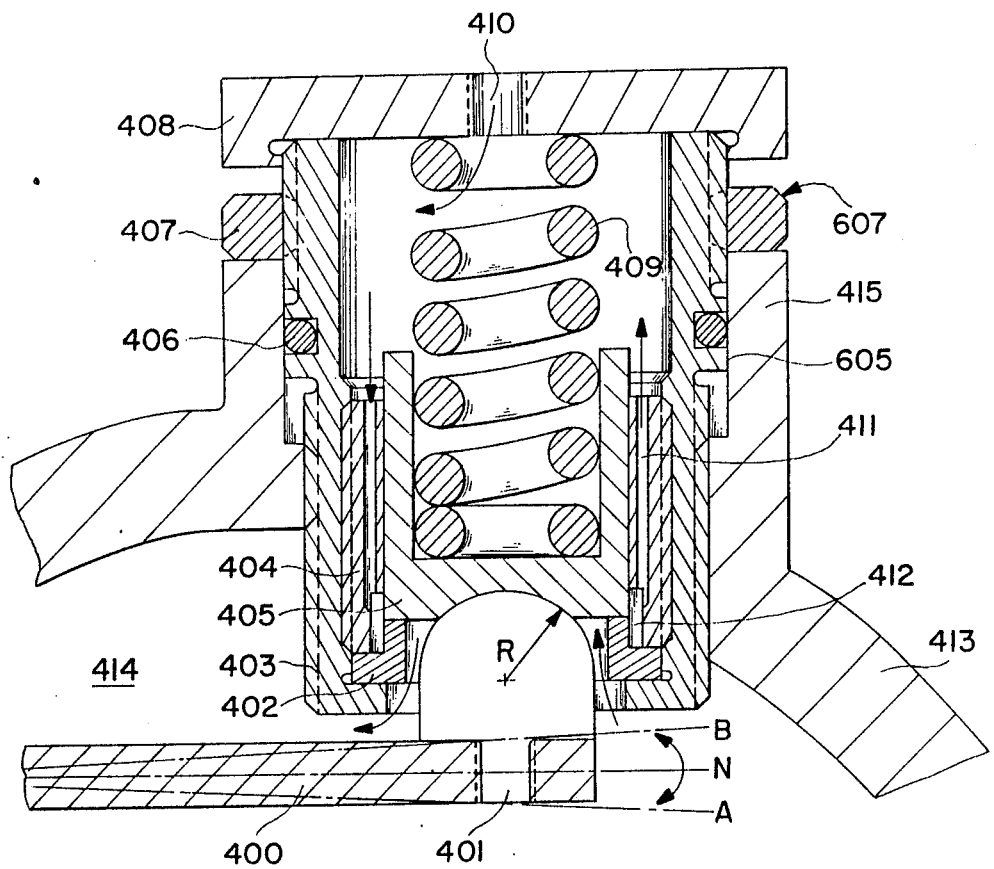
FIG. 15. illustrates a cross-section of an external inlet and vent valve with controlled pressure chamber actuation featured in FIG. 13 piping scheme and FIG. 14 block diagram.

FIG. 15 shows a cross-section of an externally located inlet valve or vent valve such as those shown in FIG. 13 which are actuated from the inside of the controlled pressure chamber despite being situated externally to the controlled pressure chamber. The valve biasing mechanism 605 and valve adjustment means 607 are positioned externally of the controlled pressure chamber 414. Follower 400, located within the controlled pressure chamber 414, is rigidly attached to semi-spherical actuation member 401 which is in contact with valve disc 405.

Disc 405 and semi-nozzle 402 provide, via lapping, a leaktight seat for inlet/vent valves such as inlet/vent valves 601, 603 shown in FIG. 13. Semi-nozzle 402 is locked by compression in between internally and externally threaded body 403 and externally threaded guide 404. Pressurized fluid is prevented from escaping out of controlled pressure chamber 414 as body 403 is made leaktight with respect to extension 415 of controlled pressure chamber housing 413 by use of O-ring 406. Disc 405, actuated by actuator 401, is biased by spring 409 having its fixed end pushing outwardly against threaded cover 408. Guide 404 has an annular space 412 communicating with holes 411, which, in turn, communicate with port 410.

Valve body 403, located within the threaded port extension 415, is adjustable. Locknut 407 allows for the fixing in place of adjustable valve body 403 relative to the actuator 401 while in an N position wherein both the inlet and vent valves are closed.

Actuator 401, controlled by the follower 400, lifts spring biased disc 405 off of seat 402. In this position, fluid can communicate in either direction from port 410 through the spring chamber into holes 411 then through annular space 412 to the controlled pressure chamber 414 as the inlet valve or in the reverse sense, as the vent valve.

Obviously, the present system is nonlinear, that is, a nonlinear system is a system to which superposition does not apply and no standard nomenclature is available.

To help illustrate the operation of the non-flowing operated relief valve in conjunction with a closed loop double feed control system and to help explain the block diagram of FIG. 14, the following list (using standard nomenclature) is provided.

Pv—desired value of the controlled variable, the dome pressure;
TR—reference input initial torque;
TB1—first feedback torque;
TB2—second feedback torque;
TE—((TB1+TB2) -R) actuating torque equation;
G1(S)—torsion bar, a control element;
G2(s)—inlet valve, a controlled element;
G3(s)—vent valve, a controlled element;
$\theta_N$—an angular displacement, a manipulated variable;
Pv—pressure of the "to be protected pressure system", the disturbance;
H1(s)—first pressure transducer, a feedback element;
H2(s)—second pressure transducer, a feedback element;
PB1—first feedback pressure equal to the controlled pressure;
PB2—second feedback pressure (optional);
Pc—controlled pressure, the controlled variable, equal to the dome pressure;
Z1(s)—DeLaval and/or Venturi at main valve exit, second indirectly controlled system element; or clearance
$L_Q$—main valve lift between piston and nozzle, a first indirectly controlled variable; and
$\overset{o}{M}_Q$—the main valve discharged mass flow rate, a second indirectly controlled variable.

The following provides a description of the block diagram (FIG. 14) in connection with FIG. 13 showing the piping scheme of the non-flowing modulating pilot operated valve with two closed feedback loops for corrosive fluids.

The desired value for the controlled variable P is "dialed" so as to correspond to a known, prescribed, start-to-leak main vessel pressure or disturbance pressure Pv. This "dialing" of the desired value Pv occurs via a reference input element having the transfer function A(s) (e.g. the reference torque TR for the torqued elements shown in FIG. 1, FIG. 3 and FIG. 10).

The vessel pressure signal, the disturbance Pv, penetrates initially the area below main valve piston in the maximum discharge coefficient providing adductor flowpath 501, line 570 and second pressure transducer 502 (having transfer function H2(s) as illustrated in FIG. 14). In the initial state, lever 504 and follower 503 are in position A due to the influence of initial reference torque. With the follower 503, in position A, the fluid finds inlet valve 603 open and vent valve 601 closed. Accordingly, disturbance Pv penetrates inside controlled pressure chamber 507; that is, through open inlet valve 603 having transfer function G2(S) (FIG. 14) and through to first pressure transducer 510 having transfer function H1(s() while vent valve G3(s) is closed.

Pressure transducers 502, 510 act in tandem at the torque summation junction 580 shown in FIG. 14 which would represent, for example, the torque affecting torsion bar 52 shown in FIG. 1.

A comparison of the torques under the equation TE=((TB1+TB1)-TR) shows that activating torque TE is initially a negative value and therefore activating torque TE is insufficient to move lever 504 from its resting position against stop 568 in FIG. 13. For increasing vessel pressure Pv, TE in the equation above, becomes a small positive torque sufficient to overcome reference torque TR as well as any friction which develops in the rotation of follower 503 and lever 504. This increase in the value of TE results in follower 503 and lever 504 eventually moving from rest position A to position N. With a view to FIG. 14, it can be seen that the variation in TE is shown as a function G1(S) for the torsion bar which produces manipulated variable $\theta_M$ indicative of angular displacement of the torsion bar.

Angular displacement $\theta_M$ acts on both inlet and vent valves G2(s) and G3(s) in FIG. 14 (or 601 and 603 in FIG. 13) in a direction which causes inlet valve 603 to assume the closed position N. In position N the vent valve 601 is also closed thus "locking" an amount of fluid inside both dome pressure chamber 509 and controlled pressure chamber 507 (FIG. 13). First pressure transducer 510 is thus isolated from vessel pressure Pv. With this arrangement, any further increase in vessel pressure Pv is sensed only by second pressure transducer 502 in FIG. 13. The resultant increased torque TB2 added to the "locked in" pressure torque TB1 generates a torque TE large enough to create an increased angular rotation $\theta_M$ and movement of lever 504 and follower 503 from the N position to the B position. While the inlet valve remains closed the vent valve opens, discharging fluid. The discharge of a finite amount of fluid from the "locked" fluid mass decreases the controlled pressure Pc inside dome 509, controlled pressure chamber 507 and first pressure transducer 510 which provides a first pressure feedback as shown in FIG. 13. FIG. 14 shows the controlled pressure Pc equal to the first feedback pressure (Pc =PB1) acting on the first pressure transducer H1(s) while the second pressure transducer H2(s) is always initially at vessel pressure Pv. The now reduced TB1 and increased TB2 have values which results in the return of the system while under the influence of TR back to N.

This process repeats itself, provided the vessel pressure is increasing with time. The decreasing controlled pressure Pc which is equal to the dome pressure $P_D$ will eventually allow the piston 511 in FIG. 13 to start-to-leak and to start-to-move due to a new force balance among the opening jet impinging force, piston biasing force and friction force.

The transfer function Z1(s) of the piston-covers-nozzle system in FIG. 14 provides the main valve with a clearance called lift $L_Q$, a first indirectly controlled variable. The discharging fluid flowing through a DeLaval nozzle for gases or a Venturi device for liquids 512 as shown in FIG. 13 produces a region of the pressure smaller than the surroundings. An internal or external fluid communication line 513 connecting the low pressure main valve exit region to the pilot's second chamber 514 provides a second feedback loop. This second feedback loop changes the pressure differential on pressure transducers 502 and 510 shown in FIG. 13.

The transfer function Z2(s) of the DeLaval nozzle P or Venturi 900 located inside the main exit is shown in FIG. 14 as feeding back a second back pressure PB2. The second backpressure PB2 is added to the vessel pressure Pv and the resultant acts on the second pressure transducer H2(s). The closing cycle which develops is of the sequence N-A-N.

The second feedback loop, having the second feedback pressure PB2 controlled by the discharged massflow rate $\dot{M}_Q$ through the main valve exit, increases the set pressure utilization domain, especially for very low set pressures, and extends the modulating or proportionality range of the pilot operated pressure relief valve adding robustness to the control system. Another advantage of the second feedback loop is that it helps in controlling the system by utilizing another variable of the system which by itself would be difficult to measure.

By inserting additional electro-mechanical and 507, the electrical pressure signals are a measure of the discharging massflow rate and of the main valve's lift or clearance status. The pilot operated pressure relief valve becomes a "smart" valve, informing a computer via analog-to-digital conversion about its status This electrical/digital feedback to a computer is optional. Nonetheless, in addition to the enhanced field testing capabilities and the "smartness" of the valve, there is provided the classical electro-pneumatic or electro-hydraulic servo valve behavior which allows a computer and/or operator to override the pilot.

As shown in FIG. 13, two solenoid valves are provided for overriding the pilot. To override the pilot the first chamber 507 is evacuated upon actuation of the first solenoid valve 517, and the second solenoid valve 518, when actuated, interrupts the communication of the vessel pressure to the pilot. Signal conditioners, analog-to-digital and digital-to-analog conversion boards, NEMA enclosures of all electric devices and communication means to and from the computer are not shown, but implied.

While preferred embodiments of the invention have been shown and described modifications thereof ca be made by one skilled in the art without departing from the spirit of the invention.

What is claimed is:

1. A pilot device for use in a relief valve system wherein said pilot device controls a piston-covers-nozzle type of main valve connected to a pressure system which is protected by the relief valve system, said pilot device being operable to control the pressure in a dome pressure chamber of the main valve with the dome pressure biasing the piston in the main valve to regulate fluid flow through the main valve, said pilot device comprising:

a housing having a first controlled pressure chamber and a second pressure chamber, said first controlled pressure chamber including a first pressure inlet port, a second pressure venting port, a third dome pressure communication port and a fourth pressure transducer feedback port;

a torsion device adapted to assume a pre-set torque position;

first and second pressure transducers located in said second pressure chamber, said first and second pressure transducers being in communication with said torsion device, and said first pressure inlet port communicating with both the pressure system protected by the relief valve system and said second pressure transducer, and said second pressure venting port adapted to vent pressurized fluid in said first controlled pressure chamber to a venting area;

follower means for opening and closing said first pressure inlet port and said second pressure venting port, and said follower means being responsive to movement of said torsion device;

said third dome communication port connecting said first controlled pressure chamber to the dome pressure chamber of the main valve;

said fourth pressure transducer feedback port being in communication with said first pressure transducer so as to provide a first feedback line;

said first pressure transducer having means for sensing pressure variations in said first controlled pressure chamber and means for applying torque to said torsion device in response to pressure variations in said first controlled pressure chamber;

said second pressure transducer having means for sensing pressure variations in the pressure system protected by the pilot operated relief valve, and means for applying torque to said torsion device in response to the sensed pressure variations of the pressure system protected by the pilot operated relief valve.

2. A pilot device as recited in claim 1, wherein said first and second pressure transducers act in tandem to apply a torque against said torsion device which adds-up to balance the torque in said torsion device.

3. A non-flowing modulating pilot device for use in a relief valve system wherein the pilot device controls a piston-covers-nozzle type of main valve connected to a pressure system which is protected by the relief valve system, said pilot device receiving a pressure signal corresponding to the pressure in the pressure system and being operable to control the pressure in a dome pressure chamber of the main valve with the dome pressure-biasing the piston in the main valve against a nozzle in the main valve, said pilot device comprising:

a housing which has a first controlled pressure chamber and a second pressure chamber;

a pre-set torsion device located in the second pressure chamber and secured at one end to said housing and the other end to a lever;

first and second pressure transducers secured at one end to said housing and at the other end to said lever, said first and second pressure transducers and lever being located in said second pressure chamber;

said first controlled pressure chamber including a first pressure inlet port, a second pressure venting port, a third dome pressure communication port, and a fourth pressure transducer feedback port;

said first pressure inlet port communicating at one end with both the pressure system protected by the pilot operated pressure relief valve and said second pressure transducer, and said first pressure inlet port communicating at the other end with said first controlled pressure chamber;

said second pressure venting port communicating at one end with a venting area, and at the other end with said first controlled pressure chamber;

a follower device responsive to movement of said torque device and said follower device including port covering means for covering said first pressure inlet port when said covering means is in contact with said first pressure inlet port and covering said second pressure venting port when said covering means is in contact with said second pressure venting port;

said third dome communication port connecting said first controlled pressure chamber to the dome pressure chamber of the main valve;

said fourth pressure transducer feedback port connecting said first controlled pressure chamber to said first pressure transducer so as to provide a first feedback line;

said first pressure transducer having means for sensing pressure variations in said first controlled pressure chamber and means for applying torque to said preset torsion device in response to pressure variations in said first controlled pressure chamber;

said second pressure transducer having means for sensing pressure variations in the pressure system protected by the pilot operated pressure relief valve, and means for applying torque to said preset torsion device in response to the sensed pressure variations of the pressure system protected by the pilot operated pressure relief valve;

said first and second pressure transducers being positioned so as to act in tandem with respect to said torsion device.

4. A pilot device as recited in claim 3, wherein said first and second pressure transducers act in tandem to apply a torque against said torsion device which balances the torque in said torsion device.

5. A device as recited in claim 3, wherein said second chamber is sealed from said first controlled pressure chamber, and said pilot device further comprising fail safe means which includes a vent hole in said second pressure chamber and a rupture device in a common boundary wall of said first controlled pressure chamber and said second pressure chamber.

6. A pilot device as recited in claim 3, wherein said housing includes first and second external chambers extending externally off said first controlled pressure chamber, said first external chamber having an opening in common with said first pressure inlet port and said second external chamber having an opening in common with said second pressure venting port, and said follower includes port covering means having port closing biasing mechanisms positioned within said first and second external chambers and external to said first controlled pressure chamber, said port closing biasing mechanisms adapted to prevent fluid flow through said first pressure inlet port and said second pressure venting port.

7. A device as recited in claim 3, wherein said second pressure chamber is sealed from said first controlled pressure chamber and said second pressure chamber is at a pressure equal to the pressure of the venting area.

8. A device as recited in claim 3, wherein said second pressure chamber is sealed from said first controlled pressure chamber and said second pressure chamber is in communication with an exit conduit of the main valve and subject to variations in pressure in accordance with variations in mass flow rate through the exit conduit, the communication between the exit conduit and said pressure chamber constituting a second pressure feedback line.

9. A device as recited in claim 3, wherein said torsion device includes a torsion bar having a central axis and first and second ends, said first end adjustably fixed to said housing, said lever rigidly fixed to said torsion bar and extending on opposite sides of the central axis, and said follower device rigidly fixed t said torsion device and extending on opposite sides of the central axis.

10. A device as recited in claim 9, wherein said lever is located in said second pressure chamber and said follower is located in said first controlled pressure chamber and said follower and lever rotate with the same angle of rotation.

11. A device as recited in claim 9, wherein said lever includes connecting means at each end which are connected, respectively, to said first and second pressure transducers.

12. A device as recited in claim 3, wherein said follower includes port covering means having contact surfaces for contact with said first pressure inlet port and said second pressure venting port and said contact surfaces being essentially planar and adapted to rotate about the central axis of said torsion bar.

13. A device as recited in claim 12, wherein said port covering means include an elastic pad.

14. A device as recited in claim 13, wherein said port covering means further includes a metal disc secured to one end of said elastic pad.

15. A device as recited in claim 13, wherein said port covering means includes a lapped metal disc and a spring.

16. A device as recited in claim 15, wherein said metal disc and spring are contained within a retainer having one end fixed to said follower and a second end with an inwardly extending flange which traps said metal disc within said retainer.

17. A device as recited in claim 3, wherein said first pressure inlet port and said second pressure venting port each include a nozzle with a concave end, and said port covering means includes a bearing ball attached to each end of said follower.

18. A device as recited in claim 3, wherein said first pressure port and said second pressure venting port each include a nozzle, and said port covering means includes a conical poppet attached to each end of said follower.

19. A device as recited in claim 3, wherein said first pressure inlet port and said second pressure venting port each include a nozzle, and an 0-ring is positioned in a recess formed in the end of each nozzle for contact with said port covering means.

20. A device as recited in claim 3, wherein said first pressure inlet port includes an adjustable inlet nozzle which extends into said first controlled pressure chamber and said second pressure venting port includes an adjustable vent nozzle which extends into said first controlled pressure chamber.

21. A device as recited in claim 3, wherein said torsion device includes torsion rods each one secured to a common base and means for interconnecting each torsion rod to another one of said torsion rods.

22. A device as recited in claim 3, wherein said housing includes clamping sections having adjustable clamping surfaces, said torsion device including a torsion bar with attachment means formed at one end, said adjustable clamping surfaces being movable into a position which firmly secures said torsion bar in place.

23. A device as recited in claim 22, wherein, when said device is in a vertical position colinear with the direction of gravitation force, the weight of said torsion device, said lever, said pressure transducers, said follower and said port covering means is solely supported by said clamping surfaces.

24. A pilot as recited in claim 22, further comprising initial torsion adjustment means which includes an ear extending off of said housing, an attachment device having a first end suited for attachment to said attachment means of said torsion bar and a second end movably secured to said ear.

25. A device as recited in claim 3, wherein said torsion device includes a torsion bar adapted for rotation within said housing, said torsion bar having a first end secured to said housing and a lever, said lever being rigidly fixed to said torsion bar at a point between the two ends of said lever, said first and second pressure transducers positioned within said housing on opposite sides of said lever and having connecting means for attachment to said lever.

26. A device as recited in claim 25, wherein said first and second pressure transducers include a casing fixed to said housing with said casing having a fluid transport opening and a connecting means opening, a pressure deformable device positioned within said casing so as to seal said fluid transport opening from said connecting means opening, and said connecting means connecting said pressure deformable device to said lever.

27. A device as recited in claim 25, wherein said first and second pressure transducers include a casing fixed to said housing, said casing having a fluid transport opening and a second opening, said first and second pressure transducers further including an amplifying pressure deformable device which includes a first fluid filled chamber positioned within said casing and a second smaller fluid filled chamber extending out away from said casing such that fluid is free to pass between said fluid filled chambers, and said connecting means connecting each pressure transducer to said lever.

28. A device as recited in claim 25, wherein said first and second pressure transducers include a casing fixed to said housing with said casing having a fluid transport opening at one end and a connecting means opening at the other end, a piston is slidably received within said casing and said connecting means connecting said piston to said lever.

29. A device as recited in claim 3, further comprising a torsion stop fixed within said housing so a to abut said lever upon said lever reaching a predetermined degree of rotation.

30. A device as recited in claim 3, wherein said torsion device includes a torsion bar having a central axis and first and second ends, said first end releasably fixed to said housing, said torsion device including a lever rigidly fixed to said torsion bar and extending on opposite sides of the central axis, said torsion device further including a follower positioned with said first controlled pressure chamber and having an elastic blade with a mid-region which is fixed to the second end of said torsion bar and two ends secured to said housing.

31. A device as recited in claim 30, wherein said covering means includes a pair of covering devices each one secured to said blade on opposite sides of the central axis, and said blade being formed in an essentially sinusoidal shape with said covering devices positioned on respective peaks of the sinusoidal shaped blade and said first pressure inlet port and said second pressure venting port each including a nozzle with an opening adapted to be covered by said covering devices.

32. A device as recited in claim 31, further comprising a blade locking member which releasably secures said blade to the second end of said torsion bar.

33. A device as recited in claim 3, wherein said torsion device includes a lever secured to said first and second pressure transducers, said lever is in connection with an intermediate member which extends into said first controlled pressure chamber and said torsion device further including first and second elastic blades, said first blade having a higher modulus of elasticity than said second blade and said first and second blades each being secured to said intermediate member and said first and second blades having an end secured to said housing.

34. A device as recited in claim 33, wherein said elastic blades extend to opposite sides of said intermediate member and are curved such that the total length of said first and second blades is essentially sinusoidal in shape.

35. A device as recited in claim 34, further comprising nozzles positioned within said first pressure inlet port and said covering means including a pair of covering devices for covering said nozzles with a first of said pair secured to said first elastic blade and a second of said pair secured to the second elastic blade.

36. A device as recited in claim 35, further comprising adjustment means for varying the degree of curvature and initial torque in said curved elastic blades, said adjustment means including screw members pushing at one end of said elastic blades said adjustment means further including a locking nut and a split cylinder, the split cylinder being adjustable and lockable relative to said housing by said locknut.

37. A device as recited in claim 33, wherein said lever is in the form of a reversed cup having a small axial height to diameter ratio.

38. A device as recited in claim 37, further comprising adjustment means for adjusting the curvature of at least one of said blades, said adjustment means including a rotating split cylinder secured to one end of one of said elastic blades and a locknut.

39. A pilot operated pressure relief valve for protecting a pressure system, comprising:
 a non-flowing modulating pilot device having a first controlled pressure chamber and a second pressure chamber;
 a main valve in communication with said non-flowing modulating pilot device, said main valve having an exit conduit and a dome pressure chamber;
 an adductor flowpath connecting the pressure system to said main valve;
 cover means for covering said adductor flowpath and sealing an opening of said adductor flowpath from the exit conduit of said main valve, said exit conduit having a restricted flowpath portion so as to create a lower pressure area in said exit conduit;
 a first communication channel extending between said first controlled pressure chamber and the pressure system, and a second communication channel extending between the exit conduit and said second pressure chamber, and said second communication channel having a first end opening into said lower pressure area in said exit conduit.

40. A pilot operated pressure relief valve as recited in claim 39, wherein said restricted flowpath portion includes a nozzle section having a convergent and a divergent passageway and said second communication channel including means to transduce variations in massflux of fluid through said exit conduit to pressure signals which are passed in said second communication channel to the second pressure chamber of said non-flowing modulating pilot device.

41. A pilot operated relief valve, for use with a pressure system comprising:
 a main valve having a dome pressure chamber and cover means for covering a nozzle of said main valve which is in communication with the pressure system;
 a non-flowing modulating pilot device having a housing with a controlled pressure valve chamber and a second chamber, said first controlled chamber including a vessel pressure inlet port, a vent port, and a first and second communication ports, said first communication port being adapted for communication with said dome pressure chamber;
 a torsion device position within said housing;
 first transducer means for sensing pressure variations in said valve chamber and transforming the pressure variations to first angular displacement means which displaces said torsion device, said second transducer being in line with the pressure vessel system and said pressure vessel inlet port.
 second transducer means for sensing pressure variations in the pressure vessel and transforming the pressure variations to second angular displacement means which displaces said torsion device, said second transducer being in line with the pressure vessel system and said pressure vessel inlet port.

42. A pilot operated relief valve as recited in claim 41, wherein said main valve includes a main cylinder partially defining said dome pressure chamber and said cover means including a main disc slidably received within said dome pressure chamber, said main disc covering the nozzle of said main valve, and said main valve further including biasing means for biasing said main disc into contact with the nozzle of said main valve.

43. A pilot operated relief valve as recited in claim 42, wherein said biasing means includes a spring device and the pressure within said pressure chamber.

44. A pilot operated relief valve as recited in claim 41, wherein said torsion device includes a torsion bar having a central axis and first and second ends with said first end releasably fixed within said housing, said torsion device including a lever rigidly fixed to said torsion bar and extending to both sides of the central axis, said torsion device further including a follower extending to opposite sides of the central axis.

45. A pilot operated relief valve as recited in claim 44, wherein said torsion bar is adapted to rotate within said housing in response to first and second said angular displacement means.

46. A pilot operated relief valve as recited in claim 45, wherein said follower includes covering means for covering said inlet and vent ports when said covering means are rotated into engagement with said inlet and vent ports, and said first and second transducer means being positioned on opposite sides of said lever such that a displacement by said first transducer causes an angular displacement in said second transducer.

47. A pilot operated relief valve as recited in claim 45, wherein said torsion device includes an elastic blade including a first portion and a second portion with the first portion having a higher modulus of elasticity than said second portion.

48. A pilot operated relief valve as recited in claim 45, wherein said elastic blade is positioned within said controlled pressure valve chamber and adjustably secured to said housing.

49. A pilot operated relief valve as recited in claim 48, wherein said torsion device includes an intermediate member and a lever with said lever connected to said transducers.

50. A pilot operated relief valve as recited in claim 49, further comprising an adjustment device which includes a rotating, half-split cylinder attached to one end of said elastic blade and a screwed member adjusting to said electric blade initial curvature.

51. A pilot operated relief valve as recited in claim 41, wherein said torsion device includes a lever which is a flat disc with a short cylindrical skirt, and at the outside diameter of said cylindrical skirt said transducers are connected in diametrically opposed position to the cylindrical skirt.

52. A pilot operated relief valve as recited in claim 51, wherein said main valve includes a casing and said pilot housing is positioned within a recess formed in said casing directly above said dome pressure chamber.

53. A pilot operated relief valve as recited in claim 52, wherein said pilot housing and said main valve casing each include an internal conduit which together form an internal passageway which communicates system pressure to one of said transducers.

54. A pilot relief valve as recited in claim 53, wherein sealing means is positioned between a contacting surface of said casing and housing, said sealing means surrounding the openings for said internal conduits.

55. A pilot operated relief valve as recited in claim 41, wherein said torsion device includes an elastic blade.

56. A pilot operated relief valve as recited in claim 55, wherein said torsion device further includes an intermediate member and a lever, said elastic blade positioned within said controlled pressure valve chamber and having an essentially sinusoidal shape with ends adjustably fixed to said housing and said elastic blade being attached in a mid-region thereof to said intermediate member.

57. A pilot operated relief valve as recited in claim 56, further comprising covering means secured to said elastic blades and adapted to cover said inlet and vent ports.

58. A pilot operated relief valve as recited in claim 57, wherein said first and second transducers are connected to said lever.

59. A pilot device as recited in claim 3, wherein the housing has a top which supports the weight of said torsion device.

60. A pilot device as recited in claim 3, wherein said blades support the weight of the blades, intermediate member and lever so as to minimize friction.

61. A pilot device as recited in claim 41, having means for placing said vessel pressure inlet port and said vent port into one of the following states:
  A—inlet port open and vent port closed
  N—inlet port closed and vent port closed
  B—inlet port closed and vent port open
repeated in the following sequence by oscillating angular motion in said torsion device:
  A-[N-B-N]-[N-B-N]-[N-B-N]. . . -B-N-A-[N-A-N]-[N-A-N]-[N-A-N]- . . . -N-A
each state change governed by a rotational motion of said lever and follower, N-B meaning a positive angle of rotation and B-N meaning a negative angle of rotation with N representing zero degrees.

62. A pilot operated relief valve as recited in claim 41, wherein said main valve has a dome pressure seal which has a start-to-leak dome pressure while opening which is larger or equal to a stop-to-leak dome pressure while closing.

63. A pilot operated pressure relief valve as recited in claim 41, further comprising means for presetting an initial torque in said torsion device, so as to establish a pre-set or start-to-leak main valve vessel pressure, wherein starting from an initial arbitrary condition where dome pressure is equal to the protected vessel pressure, there is a controlled dome pressure decrease with increasing vessel pressure differential relative to the pre-set or start-to-leak main valve vessel pressure.

64. A pilot operated relief valve as recited in claim 41, wherein said pilot device produces proportional variations of lift in said cover means with respect to mass-flow rate in the main valve upon overpressure of the to-be-protected pressure system.

65. A pilot operated relief valve as recited in claim 41, wherein said pilot operated relief valve exhibits a modulating behavior wherein the main valve assumes an open or closed position depending on the value of the vessel pressure derivate with time and thus minimizes losses of discharged product.

66. A pilot operated relief valve as recited in claim 41, exhibiting a full lift popping action if the vessel pressure increases suddenly with a response time essentially the same as that of a self-activated spring loaded pressure relief valve.

67. A pilot operated relief valve as recited in claim 41, having essentially the same modulating proportional performance characteristic for compressible, incompressible and multiphase fluids.

68. A pilot operated relief valve as recited in claim 41, having a Couloumb friction force dependent performance.

69. A pilot operated relief valve as recited in claim 41, having one of said transducer means working as a pressure feedback of a control system.

70. A pilot operated relief valve as recited in claim 41, having a first mandatory feedback loop connecting two transducer means to said controlled pressure valve chamber and a second feedback loop connecting an exit conduit of said main valve to a second pressure chamber of said pilot.

71. A pilot operated relief valve as recited in claim 41, wherein said transducer means are selected from the group consisting of:
  (a) bellows transducers,
  (b) piston-cylinder transducers,
  (c) flexible membranes,
  (d) flexible diaphragms, or
  (e) a combination of one or more of a–d above.

72. A pilot operated relief valve as recited in claim 41, wherein said pilot device includes an adjustable fluid dynamic resistor positioned within a communication line between said first controlled pressure chamber and said dome pressure chamber, said pilot device, with said fluid dynamic resistor, being adaptable to control a variety of different main valve sizes as well as fluids of different pressures and temperatures.

73. A pilot operated relief valve as recited in claim 41, including an elastomeric seal positioned between said main valve and said closure means.

74. A pilot operated relief valve as recited in claim 41, which is field testable for a set pressure value without having to open the main valve and thereby minimizes fluid loss.

75. A pilot operated relief valve as recited in claim 41, having a field testing system which allows for the feature of field testing without the opening of the main valve, said pilot operated relief valve having a temporarily disconnectible pilot vessel signal pressure feeding line, external means for artificially increasing signal pressure with compressed fluid, and means to reconnect the pilot vessel signal pressure feeding line after a start-to-vent point at which the first relief of locked fluid from the pilot to the atmosphere through a vent valve occurs, said start-to-vent equivalent vessel pressure representing a good approximation of a start-to-leak main valve set pressure.

76. A pilot operated relief valve as recited in claim 75, wherein the artificially equivalent vessel pressure is increased beyond the start-to-leak or vent to atmosphere point.

77. A pilot operated relief valve according to claim 41, having a field testing system, said field test system including a pressure system mainframe computer, wherein a digital signal triggers an analog or digital low voltage electrical signal, said low voltage signal actuating a solenoid source to disconnect a pilot vessel pressure feeding line from the main valve by closing a spring loaded check valve and the external pressure source adapted to open the pilot operated relief valve upon venting of pressurized fluid to the atmosphere.

78. A pilot operated relief valve as recited in claim 74, including a feeding line opening into the protected vessel system and communicating with said inlet valve and said second transducer means, a check valve positioned on said feeding line, an overriding pressure release valve in communication with said controlled pressure chamber; first sensing means for sensing pressure in said first controlled pressure chamber and converting the sensed pressure to a digital signal; second sensing means for sensing pressure in said second chamber and converting the sensed pressure to a digital signal; a first solenoid valve in communication with said check valve and a second solenoid valve in communication with said overriding pressure release valve; means for receiving and evaluating said digital signals and for biasing said first and second solenoid valves in accordance with the evaluated signals.

79. A pilot operated relief valve as recited in claim 41, wherein said pilot device controls the main valve dome pressure inversely proportional to the overpressure of the to-be-protected pressure system relative to a predeterminable reference pressure, such that dome pressure decreases linearly with increasing overpressure for an overpressure range larger or equal to 5% of the reference pressure; and said dome pressure increases linearly with decreasing overpressure for an overpressure range larger or equal to 5% of the reference pressure.

80. A pilot operated relief valve as recited in claim 41, having a pilot device having a short blowdown of the main valve wherein there exists a difference as small as 2% between the main valve start-to-leak vessel pressure and the pressure involved in a full valve lifting cycle which reaches maximum massflux through the main valve at linear lift values of approximately one quarter of main valve nozzle minimum bore diameter.

81. A pilot operated relief valve as recited in claim 41, having a design adjustable modulating and pop action response to vessel pressure history, said response at pop action producing opening time values of less than 50 milliseconds, as required by rapid processes occurring in pressure systems to be protected by said pilot operated relief valve.

82. A pilot operated relief valve as recited in claim 39, having an essentially linear main valve flowpath geometry and local pressure dependent splitted flowforce vs. lift and relative position of the moving parts at constant vessel pressure characteristics, said flowforces being independent of the value and variations of the lower pressure region of the said pilot operated relief valve.

83. A pilot operated relief valve as recited in claim 39, wherein said restricted flowpath portion includes a Pitot Prondtl tube positioned in the exit conduit and said second communication channel including means to transduce variations in massflux of fluid through said exit conduit to pressure signals which are passed in said second communication channel to the second pressure chamber of said non-flowing modulating pilot device.

84. A pilot operated relief valve as recited in claim 41, wherein said housing includes first and second external chambers extending externally off said first controlled pressure valve chamber, said first external chamber having an opening in common with said pressure inlet port and said second external chamber having an opening in common with said vent port, and said non-flowing modulating pilot device having port covering means having port closing biasing mechanisms positioned within said first and second external chambers and external to said first controlled pressure valve chamber, said port closing biasing mechanism having means to prevent fluid flow through said pressure inlet port and said vent port.

85. A pilot operated relief valve as recited in claim 84, wherein said port covering means includes an adjustable nozzle insert extending from said pressure chamber into a respective one of said external chambers, a semi-nozzle fixedly received within said nozzle insert, said port closing biasing means include a spring biased cap positioned so as to come in sealing engagement with said semi-nozzle so as to prevent fluid flow through said nozzle insert and said semi-nozzle, a guide fixedly received within said nozzle insert and adapted to guide said cap into proper engagement with said semi-nozzle and said cap and guide being arranged so as to prevent fluid flow therebetween, a plurality of fluid conduits formed in said guides which are arranged so as to allow for one way fluid flow of fluid out of said pressure chamber upon movement of said follower and compression of said spring biased cap away from contact with said semi-nozzle.

86. A pilot operated relief valve as recited in claim 70, wherein said exit conduit includes a restricted flowpath portion so as to create a lower pressure area in said exit conduit, and said second feedback loop having an end which is in communication with the lower pressure area of said exit conduit.

87. A pilot operated relief valve as recited in claim 86, wherein said restricted channel portion includes a nozzle section having a convergent and a divergent passageway.

88. A pilot operated relief valve as recited in claim 86, wherein said restricted channel portion includes a nozzle section having positioned therein a Pitot Prondtl tube.

89. A pilot device as recited in claim 6, wherein said port covering means includes an adjustable nozzle insert extending from said pressure chamber into a respective one of said external chambers, a semi-nozzle fixedly received within said nozzle insert, said port closing biasing means including a spring biased cap positioned so as to come in sealing engagement with said semi-nozzle so as to prevent fluid flow through said nozzle insert and said semi-nozzle, a guide fixedly received within said nozzle insert and adapted to guide said cap into proper engagement with said semi-nozzle and said cap and guide being arranged so as to prevent fluid flow therebetween, a plurality of fluid conduits formed in said guides which are arranged so as to allow for one way fluid flow of fluid out of said pressure chamber upon movement of said follower and compression of said spring biased cap away from contact with said semi-nozzle.

* * * * *